United States Patent
Kouzu et al.

(10) Patent No.: US 9,614,216 B2
(45) Date of Patent: Apr. 4, 2017

(54) NEGATIVE ELECTRODE MATERIAL FOR LITHIUM ION SECONDARY BATTERY, METHOD FOR MANUFACTURING SAME, NEGATIVE ELECTRODE FOR LITHIUM ION SECONDARY BATTERY, AND LITHIUM ION SECONDARY BATTERY

(75) Inventors: Masayuki Kouzu, Hitachi (JP); Kento Hoshi, Hitachi (JP); Toshikatsu Shimazaki, Hitachi (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 13/992,388

(22) PCT Filed: Dec. 9, 2011

(86) PCT No.: PCT/JP2011/078558
§ 371 (c)(1),
(2), (4) Date: Jul. 23, 2013

(87) PCT Pub. No.: WO2012/077785
PCT Pub. Date: Jun. 14, 2012

(65) Prior Publication Data
US 2013/0302675 A1    Nov. 14, 2013

(30) Foreign Application Priority Data

Dec. 10, 2010  (JP) .................. 2010-275949
Dec. 10, 2010  (JP) .................. 2010-275950
Dec. 10, 2010  (JP) .................. 2010-275951
Dec. 10, 2010  (JP) .................. 2010-275977

(51) Int. Cl.
| H01M 4/583 | (2010.01) |
|---|---|
| H01M 4/36 | (2006.01) |
| H01M 4/38 | (2006.01) |
| H01M 4/587 | (2010.01) |
| H01M 10/0525 | (2010.01) |

(52) U.S. Cl.
CPC .......... *H01M 4/364* (2013.01); *H01M 4/362* (2013.01); *H01M 4/386* (2013.01); *H01M 4/587* (2013.01); *H01M 10/0525* (2013.01)

(58) Field of Classification Search
CPC ........ H01M 4/386; H01M 4/13; H01M 4/382; H01M 4/583; H01M 2004/027
USPC ................... 429/209, 231.8, 231.95
See application file for complete search history.

(56) References Cited

U.S. PATENT DOCUMENTS

| 6,344,296 B1 * | 2/2002 | Ishii et al. ................ 429/231.8 |
| 2006/0008706 A1 | 1/2006 | Yamaguchi et al. |
| 2007/0077490 A1 | 4/2007 | Kim et al. |
| 2010/0136432 A1 * | 6/2010 | Kim ................. H01M 4/133 429/231.8 |

FOREIGN PATENT DOCUMENTS

| JP | 10-236809 | 9/1998 |
| JP | 3466576 | 11/2003 |
| JP | 2005-149946 | 6/2005 |
| JP | 2006-228640 | 8/2006 |
| JP | 2006228640 | * 8/2006 |
| JP | 3987853 | 10/2007 |
| JP | 3995050 | 10/2007 |
| JP | 2008-235258 | 10/2008 |
| JP | 2008-277232 | 11/2008 |
| KR | 10-2010-0062083 | 6/2010 |

OTHER PUBLICATIONS

Claims Correspondence Table, 1 page.
Declaration of Mihoko Takahashi, 1 page.
All claims which were indicated as having novelty, inventive step and industrial applicability by the International Searching Authority in the PCT Application, 3 pages.
English Translation of the clams which were indicated as having novelty, inventive step and industrial applicability by the International Search Authority in the PCT application, 2 pages.
Written Opinion of International Searching Authority (PCT/ISA/237) mailed Feb. 28, 2012 in connection with PCT/JP2011/078558; 3 pages.
English Translation of Written Opinion of International Searching Authority (PCT/ISA/237) mailed Feb. 28, 2012 in connection with PCT/JP2011/078558; 3 pages.
International Search Report mailed Feb. 28, 2012, in connection with PCT/JP2011/078558; 1 page.
Communication mailed Nov. 18, 2013, in connection with Korean Patent Application No. 2013-7017457, 5 pages; Korean Patent Office, Republic of Korea.
Extended European Search Report mailed May 21, 2014, in connection with European Application No. 11846576.4; 6 pages; European Patent Office; Munich, Germany.
Communication mailed Sep. 24, 2014, in connection with Japanese Patent Application No. 2010-275951, with English Translation thereof, 4 pages.
European Office Action, dated Dec. 22, 2104, in corresponding EP Application 11 846 576.4-1360.

* cited by examiner

*Primary Examiner* — Ula C Ruddock
*Assistant Examiner* — Thomas Parsons
(74) *Attorney, Agent, or Firm* — Fitch, Even, Tabin & Flannery, LLP

(57) ABSTRACT

The invention provides a negative electrode material for lithium ion secondary battery, including a composite particle of a first particle containing a carbonic substance A and a second particle containing silicon, which are combined with a carbonic substance B, wherein, when a cross-section of the composite particle is observed with respect to: the content of silicon atom in a core region in a circle having a center thereof on the midpoint of the major axis, which constitutes the maximum length, and having a radius of ⅛ of the length of the minor axis orthogonally intersecting the major axis at the midpoint thereof, and the content thereof in a rim region extending from the circumference to a depth of ⅛ of the length of the minor axis, the ratio of the content in the rim region to that in the core region is 2 or higher.

12 Claims, 11 Drawing Sheets

NEGATIVE ELECTRODE MATERIAL FOR LITHIUM ION SECONDARY BATTERY, METHOD FOR MANUFACTURING SAME, NEGATIVE ELECTRODE FOR LITHIUM ION SECONDARY BATTERY, AND LITHIUM ION SECONDARY BATTERY

TECHNICAL FIELD

The present invention relates to a negative electrode material for a lithium ion secondary battery and a production method thereof, as well as a negative electrode for a lithium ion secondary battery, and a lithium ion secondary battery.

BACKGROUND ART

Since mobile devices, such as a cell phone and a notebook computer, have come to have higher performance, a demand for higher capacity of a lithium ion secondary battery has become stronger. Conventionally, graphite has been mainly used as a negative electrode material for a lithium ion secondary battery, however, aiming at higher capacity, development of a negative electrode material containing an element, which has high theoretical capacity and ability for absorption and desorption of a lithium ion (hereinafter also referred to as "specific element", and that containing the specific element is also referred to as "specific element substance"), has become active.

As the specific element, silicon, tin, lead, aluminum, etc. are well known. Among others, silicon and silicon oxide have advantages over other specific element substances, since they have a higher capacity, are inexpensive, and have a better processability, negative electrode materials containing them are especially energetically studied.

Meanwhile, the specific element substances are known to cause remarkable cubical expansion when alloyed by charging. Such cubical expansion micronizes a specific element substance itself, and further destroys the structure of a negative electrode material using the same, leading to a breakage of the electrical conductivity. Therefore it has a drawback in that the capacity decreases significantly over cycles.

To eliminate the drawback, a technique has been proposed, by which a specific element substance is micronized and combined with graphite using a carbonic substance or a resin. With such a composite particle, even if a specific element is micronized by alloying with Li, the electrical conductivity can be secured by graphite or a carbonic substance, and it has been known that the cycle performance can be improved significantly compared to single use of a specific element substance as a negative electrode material.

However, still in some cases, the electrical conductivity in a composite particle is broken due to destruction of the composite particle structure by expansion during alloying with Li, and adequate cycle performance cannot be attained. For the sake of absorption and relaxation of the expansion, studies have been broadly conducted focusing on introduction of voids in a composite particle (see, for example, Japanese Patent No. 3466576, Japanese Patent Application Laid-Open (JP-A) No. 2006-228640, Japanese Patent No. 3995050, and Japanese Patent No. 3987853).

SUMMARY OF INVENTION

Technical Problem

A negative electrode material in powder form containing the composite particle mentioned above is in general coated on a current collector, and then used after adjusting the electrode density using a roll press or the like. However, a composite particle including many voids as above has poor compaction properties for roll pressing, and since the electrode density becomes low, when it is assembled in a lithium ion secondary battery, the intended high capacity performance is not realized in some cases. Further, if the electrode is roll-pressed at high pressure to achieve a high density, most of the voids in a composite particle are collapsed and the absorption and relaxation action of the voids on expansion is weakened, as a result of which the improvement effect on the cycle performance may decrease.

In general, for producing a composite particle having voids as mentioned above, a fine particle of a specific element substance and a large amount of a carbonic substance such as a fine particle of graphite, and, according to need, with further addition of a void formation material or the like, are converted to a composite particle. Since such a particle generally has a high specific surface area and contains a large amount of low crystallinity carbon, the charge and discharge efficiency decreases and the intended high capacity of a battery is not attained sufficiently in some cases.

In such a composite particle, a fine particle of a specific element substance is also distributed in the inner part of a composite particle. In such a case, the composite particle expands while forming vacancies internally in accordance with the expansion of the fine particle of the specific element substance present in the inner part of the composite particle, which may eventually expand the composite particle excessively by a synergistic action. As a result, the composite particle and a negative electrode, as well as the expansion amount thereof, become larger than the expansion amount of the fine particle of the specific element substance itself, which may result in a battery cell bulging and cause problems with regard to safety.

The present invention was conducted in view of the various problems discussed above in order to achieve objects described below. Namely, an object of the present invention is to provide a lithium ion secondary battery superior in cycle performance and safety. Another object is to provide a negative electrode material for a lithium ion secondary battery, which can configure a lithium ion secondary battery superior in cycle performance and safety and suppress expansion associated with charging, as well as a negative electrode for a lithium ion secondary battery.

Solution to Problem

Specific means for approaching the objects are as follows, and the present invention include the following aspects.

<1> A negative electrode material for a lithium ion secondary battery, the material including a composite particle of a first particle containing a carbonic substance A and a second particle containing a silicon atom, the first particle and the second particle being combined with a carbonic substance B different from the carbonic substance A, wherein, when a cross-section of the composite particle is observed with respect to:

a content of the silicon atom included in a core region of a circle, the circle having a center thereof on a midpoint of a major axis constituting a maximum length of the composite particle, and having a radius of $\frac{1}{8}$ of the length of a minor axis that orthogonally intersects the major axis at the midpoint thereof, and a content of the silicon atom in a rim region of the composite particle, which extends from a circumference of the composite particle to a depth of ⅛ of the length of the minor axis, a ratio of the content of the silicon atom in the rim region to the content of the silicon atom in the core region is 2 or higher.

<2> The negative electrode material for a lithium ion secondary battery according to <1>, wherein a ratio of the content of the silicon atom included in the core region in the circle to a total content of the silicon atom included in the cross-section of the composite particle is 0.2 or smaller.

<3> The negative electrode material for a lithium ion secondary battery according to <1> or <2>, wherein the first particle is a graphite particle with a circularity of from 0.60 to 1.00.

<4> The negative electrode material for a lithium ion secondary battery according to any one of <1> to <3>, wherein the first particle has a volume average particle size of from 5 μm to 40 μm.

<5> The negative electrode material for a lithium ion secondary battery according to <1> or <2>, wherein the first particle is a graphite particle having pores formed by assembling or binding a plurality of flat-shaped particles in such a manner that orientation planes thereof are nonparallel to each other.

<6> The negative electrode material for a lithium ion secondary battery according to <5>, wherein the first particle has an aspect ratio of from 1.2 to 5.0.

<7> The negative electrode material for a lithium ion secondary battery according to <5> or <6>, wherein a volume average particle size of the flat-shaped particles is ⅔ or less of the volume average particle size of the first particle.

<8> The negative electrode material for a lithium ion secondary battery according to any one of <1> to <7>, wherein a content of the carbonic substance B in the entire composite particle is from 1 mass % to 10 mass %, and the carbonic substance B is a carbonized organic substance.

<9> The negative electrode material for a lithium ion secondary battery according to any one of <1> to <8>, further including a substance having electrical conductivity.

<10> A method of producing the negative electrode material for a lithium ion secondary battery according to any one of <1> to <9>, the method including:

combining a first particle containing a carbonic substance A and a second particle containing a silicon atom using a carbonic substance B different from the carbonic substance A to obtain a composite particle having a volume average particle size of from 1.0 to 1.3 times the volume average particle size of the first particle.

<11> A negative electrode for a lithium ion secondary battery, including:

a current collector; and a negative electrode material layer provided on the current collector, the negative electrode material layer including the negative electrode material for a lithium ion secondary battery according to any one of <1> to <9>.

<12> A lithium ion secondary battery, including:

the negative electrode for a lithium ion secondary battery according to <11>;

a positive electrode; and an electrolyte.

Advantageous Effects of Invention

According to the present invention, a lithium ion secondary battery superior in cycle performance and safety is provided. Further, a negative electrode material for a lithium ion secondary battery, as well as a negative electrode for a lithium ion secondary battery, which is capable of forming a lithium ion secondary battery superior in cycle performance and suppress the expansion associated with charging, are provided.

BEST MODE FOR CARRYING OUT THE INVENTION

Figure 1:
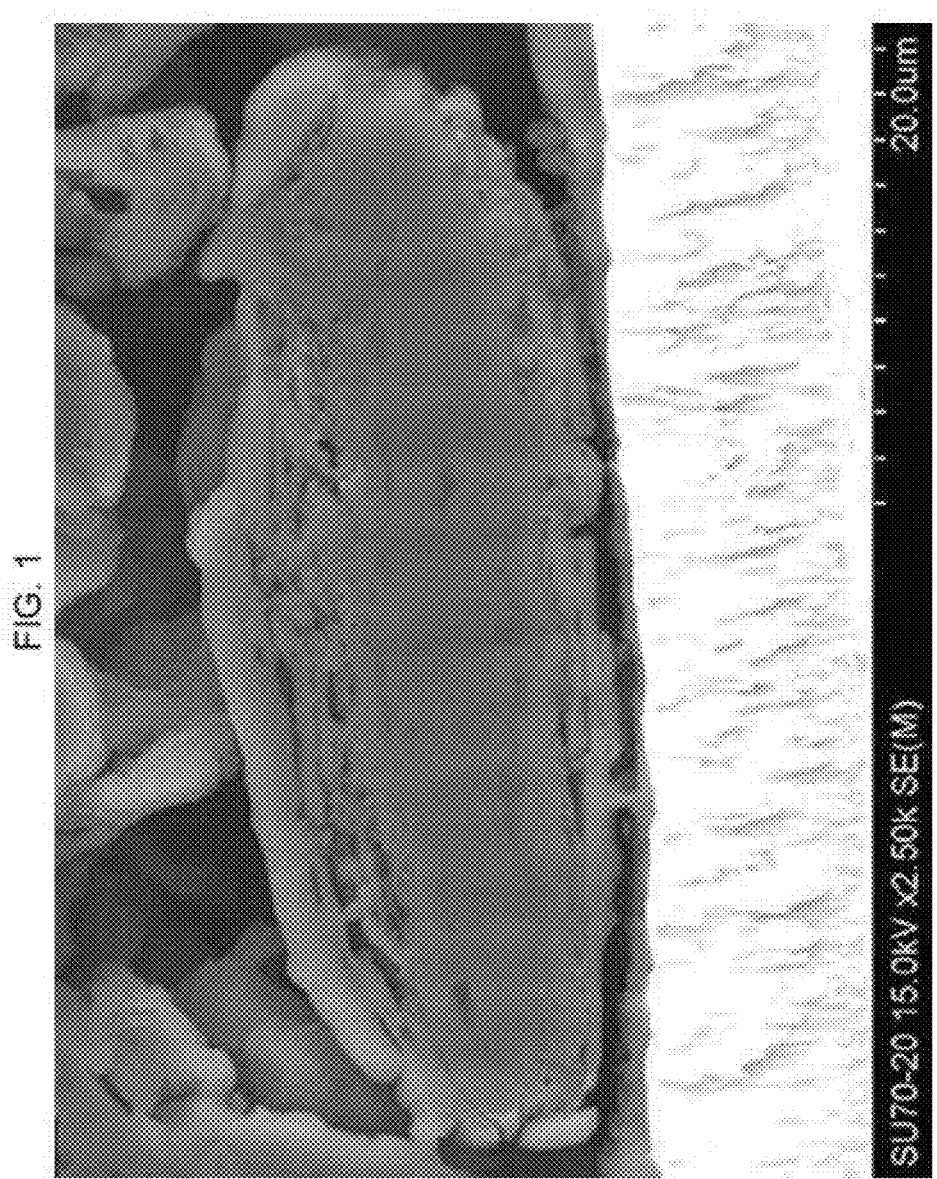
FIG. 1 is a view showing an example of a cross-sectional image of a composite particle according to Example 1 of the present invention.

Negative Electrode Material for Lithium Ion Secondary Battery

A negative electrode material for a lithium ion secondary battery (hereinafter also referred to simply as "negative electrode material") according to the present invention includes at least one composite particle in which a first particle containing a carbonic substance A and a second particle containing a silicon atom are combined using a carbonic substance B different from the carbonic substance A. Further, if necessary, other components may further be included.

When a cross-section of the composite particle is observed with respect to: the content of the silicon atom contained in a core region in a circle, the circle having a center thereof on the midpoint of a major axis constituting the maximum length of the composite particle, and having a radius of ⅛ of the length of the minor axis that orthogonally intersects the major axis at the midpoint thereof, and the content of the silicon atom in a rim region of the composite particle, which extends from a circumference of the composite particle to a depth of ⅛ of the length of the minor axis, the ratio of the content of the silicon atom in the rim region to the content of the silicon atom in the core region is 2 or higher.

In other words, it is characterized that, in the composite particle, more second particles containing a silicon atom exist at around the surface of the composite particle rather than in an inner region of the composite particle. Further, according to the present invention, it is preferable that the ratio of the content of silicon atom contained in the core region in the circle to the total content of the silicon atom contained in the cross-section of the composite particle is 0.2 or smaller.

Owing to such a combined state, the cubical expansion of a second particle in charging takes place mainly in the vicinity of the composite particle surface, and scarcely in the core of a composite particle, and therefore excessive expansion of the composite particle itself can be suppressed.

A lithium ion secondary battery constituted by including a negative electrode for a lithium ion secondary battery that is formed by using a negative electrode material for a lithium ion secondary battery containing the composite particle is superior in cycle performance and safety, and furthermore superior in battery capacity and charge and discharge efficiency.

In the present specification, the term "step" means not only an independent step, but also includes a step, which cannot be clearly distinguished from another step, but an intended function thereof can be achieved. Further, a numerical range expressed by "a to b" means a range defined by a and b as the minimum value and the maximum value, respectively. With respect to the content of each component in a composition, if plural substances exist corresponding to a component in the composition, the content means, unless otherwise specified, the total amount of the plural substances existing in the composition.

The present invention will be described more precisely below.

[Composite Particle]

In the composite particle, a first particle and a second particle are combined with a carbonic substance B. In this regard, "combining" or "combined" means that plural elements different from each other are integrated.

In a composite particle according to the present invention, at least a first particle and a second particle are integrated, and it is preferable that an independent particle is formed by integrating plural second particles with a first particle.

Examples of a specific aspect of the combining in the composite particle include an aspect in which a second particle adheres to a surface of a first particle due to the presence of a carbonic substance B between the first particle and the second particle that mediates integration, and an aspect in which a second particle adheres to a surface of a first particle through direct contact of the first particle and the second particle, and a carbonic substance B mediates integration by contacting both of the first particle and the second particle. Namely, the carbonic substance B has a function of binding a first particle and a second particle together for integration.

The combined state of a first particle and a second particle in the composite particle may be evaluated as follows. In this regard, a negative electrode material for a lithium ion secondary battery containing a composite particle that satisfies the following requirements is included in the scope of the present invention.

The combined state of a composite particle is evaluated according to the distribution status of a second particle by observing a cross-section of the composite particle. There is no particular restriction on the method for observing a cross-section of a composite particle. For example, a slurry containing a composite particle and an organic binding agent is prepared as described below, which is then coated and dried to prepare a coated electrode. A cross-section of the thus-prepared electrode is processed with a focused ion beam (FIB) or ion milling to prepare a sample with a composite particle having a cut surface. The prepared cut surface of the composite particle is then observed using, for example, a scanning electron microscope (SEM) or a scanning ion microscope (SIM).

With respect to a composite particle cross-section observed by the above-mentioned method, a composite particle satisfying conditions (a) and (b) mentioned below is selected as a subject particle for evaluation of the combined state. The definitions of major axis and minor axis in connection with the cross-section observation for (a) and (b) are described below.

(a) Particle Size

The particle size of the composite particle should be substantially equivalent to a volume average particle size (50% D) measured using a laser diffraction particle size distribution measurement apparatus. Specifically, a composite particle, in which the ratio of the length of the major axis to the volume average particle size found during a cross-section observation of the composite particle is from 1.0 to 1.2, is selected as a subject particle.

(b) Particle Condition

Broken composite particles and cracked composite particles are excluded because they are not suitable as evaluation subjects for the combined state. Namely, a composite particle is selected as a subject particle in which the number of intersection points between the composite particle circumference and the major axis or the minor axis found by a cross-section observation is respectively 2.

A cross-section of a composite particle satisfying the conditions for a subject particle for evaluating the combined state is observed to determine the center of the major axis and the length of the minor axis in the cross-section of the composite particle as follows.

Among pairs of parallel tangent lines externally touching the outline of a composite particle, a tangent line $m_1$ and a tangent line $m_2$ having the longest distance therebetween are selected. The distance between the tangent line $m_1$ and the tangent line $m_2$ is defined as the maximum length of the composite particle; namely, the length of the major axis.

The selection is preferably so made that the length of the major axis in a cross-section of a composite particle is 70% or more of the maximum length of the composite particle determined by observing the overall image of a composite particle using a scanning electron microscope (SEM) or the like. In other words, a cross-section of a composite particle is preferably selected so as to include an axis with a length equal to or close to the length of the major axis of the whole three-dimensional body of the composite particle itself. The length of the major axis of a composite particle itself is determined as the distance between two parallel planes with the maximum distance therebetween among pairs of parallel planes externally touching the outer surface of the composite particle.

Then, on the cross-section of a composite particle, two parallel tangent lines $n_1$ and $n_2$, which are orthogonal to the tangent line $m_1$ and tangent line $m_2$ and externally touch the outline of the composite particle, are selected.

A line parallel to the tangent line $n_1$ and equidistant from the tangent line $n_1$ and the tangent line $n_2$ is defined as the major axis of the composite particle. Intersection points of the major axis and the tangent line $m_1$ or the tangent line $m_2$ are defined as an intersection point $P_1$ and an intersection point $P_2$, respectively, and the midpoint of a line segment connecting the intersection point $P_1$ and the intersection point $P_2$ is defined as the midpoint of the major axis. A line passing though the midpoint of the major axis and orthogonal to the major axis is defined as a minor axis. The distance between an intersection point $Q_1$ and an intersection point $Q_2$ of the minor axis and the outline of the composite particle is defined as the length of the minor axis.

Then, on the cross-section of a composite particle, a circle having a radius of a length R that is equal to ⅛ of the length of the minor axis is described centering on the midpoint of the major axis, and the internal region of the circle is defined as a core part of the composite particle.

Meanwhile, on the cross-section of a composite particle, an inner region having a depth of the length R inward from the circumference is defined as a rim part of the composite particle.

Here, if the core part and the rim part overlap, the composite particle is excluded from subject particles for evaluating the combined state.

The thus-defined core part and rim part of a composite particle are observed respectively using an SEM, and the elements contained in the observed regions are analyzed quantitatively applying an X ray spectroscope to the observed region. Using the thus-obtained mass concentration of element, evaluation is carried out for the conditions of the combined state mentioned below, and the composite particle satisfying the conditions is eligible for constituting a negative electrode material for a lithium ion secondary battery according to the present invention.

There is no particular restriction on the X ray spectroscope, insofar as it enables quantitative analysis of the elements contained in an observation region, and examples thereof include an energy dispersive (EDX) type and a wavelength-dispersive (WDX) type.

(Conditions of Combined State)

The ratio (rim part/core part) of the content of silicon atom contained in the rim part of a composite particle to the content of silicon atom contained in the core part is 2 or higher. This means that a second particle containing a silicon atom is localized at the surface of a composite particle.

The above ratio is determined by determining respectively the ratio of the content of silicon atom to the total content of carbon atom, oxygen atom and silicon atom (Si/(C+O+Si)) in the core part, and the ratio of the content of silicon atom to the total content of carbon atom, oxygen atom and silicon atom in the rim part, and calculating the ratio of the latter to the former.

Specifically, when a quantitative analysis is conducted by, for example, an EDX, if only carbon atom, oxygen atom and silicon atom are analyzed, the ratio can be obtained by comparing only the silicon atom concentrations by mass in a core part and a rim part.

According to the present invention, the ratio is preferably 3 or higher, and more preferably 5 or higher. When the ratio is smaller than 2, expansion of a composite particle would not be suppressed adequately sometimes, and the cycle performance may decrease sometimes.

For the ratios of the content of silicon atom to the total content of carbon atom, oxygen atom and silicon atom in a core part and a rim part, specifically, 3 square regions with the side length of ⅕ to ½ times the length R are selected for the core part and the rim part, respectively, avoiding as much as possible overlapping with each other. For each selected square region, the content ratio of silicon atom to carbon atom, oxygen atom and silicon atom is measured, and an arithmetic mean value of the measured values is calculated as the ratio.

In the composite particle, the ratio of the content of silicon atom contained in the core part to the total content of silicon atom contained in the cross-section of the composite particle is preferably 0.2 or smaller, and more preferably 0.15 or smaller. This means that silicon atom is substantially absent in the core part of the composite particle.

The total content of silicon atom contained in the cross-section of a composite particle and the content of silicon atom contained in the core part may be determined similarly as described above.

According to the present invention, 10 composite particles satisfying the conditions (a) and (b) are examined with respect to the conditions of the combined state mentioned above, and if 3 or more, preferably 5 or more composite particles fulfill the conditions, the material is judged to be a negative electrode material for a lithium ion secondary battery according to the present invention.

As a method for constituting the combined state of a composite particle according to the present invention as above, for example, a method of producing a composite particle by the production method of a composite particle described below, may be used.

(First Particle)

A composite particle contained in a negative electrode material for a lithium ion secondary battery according to the present invention contains at least one first particle containing a carbonic substance A.

The first particle is constituted by containing a carbonic substance A. The carbonic substance A has preferably a higher crystallinity than that of a carbonic substance B described below. Further, a value of the average interplanar spacing ($d_{002}$) of the carbonic substance A measured by Gakushin method is preferably from 0.335 nm to 0.347 nm. Examples of a carbonic substance satisfying the above include artificial graphite, natural graphite, low crystallinity carbon, and mesophase carbon.

The average interplanar spacing ($d_{002}$) is preferably from 0.335 nm to 0.345 nm, more preferably from 0.335 nm to 0.340 nm, and further preferably from 0.335 nm to 0.337 nm, from a viewpoint of battery capacity. When the average spacing is 0.347 nm or less, the crystallinity is high, and both the battery capacity and the charge and discharge efficiency tend to be improved. On the other hand, since a theoretical value of the graphite crystal is 0.335 nm, both the battery capacity and the charge and discharge efficiency tend to be improved when the average interplanar spacing is closer to this value.

Although there is no particular restriction on the content of a carbonic substance A included in a first particle, 70 mass % or more is preferable, and 90 mass % or more is more preferable.

Although there is no particular restriction on the volume average particle size (50% D) of a first particle, it is preferably larger than a second particle described below; and preferably from 5 μm to 40 μm, more preferably from 5 μm to 35 μm, further preferably from 7 μm to 30 μm, and still more preferably from 10 μm to 30 μm.

When the volume average particle size is 5 μm or more, excessive enlargement of the specific surface area is suppressed, and the efficiency of the first-time charge and discharge is improved. Further, the electrode density is increased, and a high capacity lithium ion secondary battery is obtained. Meanwhile, when the volume average particle size is 40 μm or less, electrode properties such as the rate performance tend to be improved.

In this regard, the volume average particle size of the first particle is measured using a laser diffraction particle size distribution measuring apparatus under usual conditions.

There is no particular restriction on the form or shape of the first particle containing a carbonic substance A. Examples of the form include a single particle composed of one particle, and a granulated particle obtained by granulating plural primary particles, and any one of them may be used. Examples of the shape of a single particle include a squamous particle, and a spherical particle. Examples of the shape of a granulated particle include a spherical shape, a porous shape, and the like.

As for the form of the first particle containing a carbonic substance A, a granulated particle is more preferable than a single particle from a viewpoint of rate performance of an assembled battery. Presumably this is because, in the case a first particle is composed, for example, of a high crystallinity graphite particle, when an electrode is produced by pressing to high density, orientation of a particle granulated from plural particles in a planar direction can be more easily suppressed, so that transfer of a Li ion in a first particle can be carried out efficiently and the rate performance is improved.

As for the shape of the granulated particle, a porous shape is more preferable than a spherical shape from a viewpoint of the rate performance of an assembled battery. This is conceivably because a Li ion can diffuse easily owing to the presence of internal vacancies in, for example, a porous granulated particle, and the rate performance is improved.

Particularly, a porous particle with limited porosity, in which a second particle does not penetrate into the core part of a granulated particle, is preferable. A composite particle formed with such a granulated particle can achieve high tap density, and the electrode density of an electrode formed therewith can be improved and therefore high volumetric capacity can be achieved.

The first particle is available, for example, as commercially-available powdery carbon products. Further, it can be produced by a pulverizing or granulating treatment of artificial graphite, natural graphite, low crystallinity carbon, mesophase carbon, or the like having an average interplanar spacing of from 0.335 nm to 0.347 nm by a commonly applied method to a desired volume average particle size (preferably, from 4 μm to 40 μm).

As the first particle, it is preferable to use at least one selected from the group consisting of a particle of graphite having a circularity of from 0.60 to 1.00, and a graphite particle having pores obtained by assembling or binding plural flat particles so as to make their orientation planes nonparallel, from a viewpoint of electrical characteristics.

—Spherical Graphite Particle—

As the first particle, a graphite particle having a circularity of from 0.60 to 1.00 (hereinafter also referred to as "spherical graphite particle") is preferable.

By using a first particle in such a form, orientation of each composite particle constituting a negative electrode material in a planar direction can be suppressed when pressed to an electrode form. By this means, transfer of a Li ion in a composite particle is facilitated and a battery superior in rate performance can be constituted.

From a viewpoint of control of the particle orientation, the circularity is preferably from 0.60 to 0.95, more preferably from 0.65 to 0.90, and further preferably from 0.70 to 0.90. When the circularity is 0.60 or more, orientation of a composite particle in a planar direction can be suppressed during pressing in the formation of an electrode, and the rate performance tends to be improved. While 1.00 means a perfect circle and corresponds to the upper limit.

Herein, the circularity is a value obtained by dividing a circle perimeter calculated from an equivalent circle diameter, which is the diameter of a circle having the same area as a projected area of a graphite particle, by a perimeter (length of the outline) measured from a projected image of a graphite particle; and determined by the following formula. The circularity of a perfect circle is 1.00.

Circularity=(perimeter of equivalent circle)/(perimeter of cross-sectional image of particle)

Specifically, the circularity is determined by: observing an image enlarged 1000-fold using a scanning electron microscope; selecting randomly 10 graphite particles; measuring the circularity of each first particle according to the above method; and calculating an arithmetic mean value as the average circularity. In this connection, the circularity, and the perimeter of an equivalent circle and the perimeter of a projected image of a graphite particle can be determined by a commercially-supplied image analysis software.

There is no particular restriction on the form and shape of a spherical graphite particle, as long as the circularity is from 0.60 to 1.00. Examples of the form include a single particle composed of a particle and a granulated particle granulated from plural primary particles, and either will do. Examples of the shape of a single particle include a spherical particle. Examples of the shape of a granulated particle include a spherical shape and a porous shape.

A value of the average interplanar spacing ($d_{002}$) measured according to Gakushin method of the spherical graphite particle is preferably from 0.335 nm to 0.338 nm. Examples of graphite satisfying the condition include artificial graphite, natural graphite, and graphitized MCMB (mesophase carbon microbeads).

The average interplanar spacing ($d_{002}$) is more preferably from 0.335 nm to 0.337 nm, and further preferably from 0.335 nm to 0.336, from a viewpoint of battery capacity. When the average interplanar spacing is 0.338 nm or less, the crystallinity of graphite is high and both the battery capacity and the charge and discharge efficiency tend to be improved. Meanwhile, since the theoretical value for a graphite crystal is 0.335 nm, both the battery capacity and the charge and discharge efficiency tend to be improved when the average interplanar spacing is closer to this value.

Although there is no particular restriction on the volume average particle size (50% D) of the spherical graphite particle, it is preferably larger than a second particle described below, and preferably from 5 μm to 40 μm, more preferably from 5 μm to 35 μm, further preferably from 7 μm to 30 μm, and still more preferably from 10 μm to 30 μm.

When the volume average particle size is 5 μm or more, excessive enlargement of the specific surface area is suppressed, so that the first-time charge and discharge efficiency is improved. The electrode density is also improved and a high capacity lithium ion secondary battery can be produced. Meanwhile, when the volume average particle size is 40 μm or less, electrode properties such as rate performance tend to be improved.

The spherical graphite particle is available, for example, from many companies as commercially-available powdery carbon products.

Further, graphite, such as squamous graphite, having a circularity of less than 0.6 may be treated for spheroidizing to have a circularity of from 0.60 to 1.00 by a usually-applied spheroidizing treatment method for graphite. Further, a graphite particle may be treated for granulation to have a circularity of from 0.60 to 1.00 by a usually-applied granulation method to prepare a spherical graphite particle composed of plural particles.

Examples of the spheroidizing treatment include a mechanochemical method. Examples of the granulation method include treatment methods such as a fluidized bed granulation method, a spray dry granulation method, or an agitation granulation method.

—Aggregate Graphite Particle—

As the first particle, a graphite particle having pores, which is prepared by assembling or binding plural flat particles aligning orientation planes nonparallel to each other (hereinafter also referred to as "aggregate graphite particle") is preferable.

In a case in which an aggregate graphite particle as a first particle has such a specific structure, when formed to a negative electrode, a crystal face of a graphite particle in a negative electrode material layer formed on a current collector hardly aligns in a planar direction, and lithium can be easily absorbed and desorbed on the negative electrode. Further, since there is extensive ruggedness at the particle surface, in a composite particle having a second particle containing a silicon atom combined at the surface, the electrical conductivity among aggregate graphite particles can be maintained easily even after expansion and contraction of the second particle, enabling better cycle performance.

The flat particle means a particle in a shape having a major axis and a minor axis, which is not a perfect sphere. Examples thereof include a scaly shape, a squamous shape, and some of clumpy shapes. Concerning the aggregate graphite particle, plural flat particles aligning orientation planes nonparallel to each other means a status in which, defining a flat face of each particle, namely the most flattened face as an orientation plane, plural flat particles are assembled such that the respective orientation planes are not aligned in one direction.

In an aggregate graphite particle, flat particles are assembled or bound. In the above "bound" means a status in which particles are each chemically bound by a carbonaceous substance formed by carbonizing an organic binding agent such as tar or pitch. In addition, "assembled" means a status in which particles are not chemically bound but the assembled body can maintain its shape due to a particle shape or otherwise. In the aggregate graphite particle, the flat particles are preferably bound from viewpoint of mechanical strength.

Although there is no particular restriction on the number of flat particles assembled or bound in an aggregate graphite particle, it is preferably 3 or more, more preferably from 5 to 20, and further preferably from 5 to 15.

Although there is no particular restriction on the size of an individual flat particle constituting an aggregate graphite particle, its volume average particle size is preferably from 1 μm to 100 μm, more preferably from 1 μm to 30 μm, and further preferably from 1 μm to 20 μm.

Furthermore, the volume average particle size of an individual flat particle is preferably ⅔ or less, and more preferably from 1/20 to ⅔ of the volume average particle size of an aggregate graphite particle, from the viewpoints of battery capacity and cycle performance.

There is no particular restriction on the aspect ratio of the aggregate graphite particle. The aspect ratio is preferably from 1.2 to 5.0, more preferably from 1.3 to 4.0, and further preferably from 1.3 to 3.0, from the viewpoints of cycle performance and battery capacity.

When the aspect ratio is 1.2 or more, the contact area between particles increases and the electrical conductivity tends to be improved. Meanwhile, when the aspect ratio is 5.0 or less, a rapid charge and discharge property tends to be improved.

Putting the length along the major axis (major diameter) as A, and the length along the minor axis (minor diameter) as B, the aspect ratio is expressed by A/B. For the aspect ratio, first particles are enlarged by a microscope and 100 particles are selected randomly and the respective A/B's are measured, and an arithmetic mean value is calculated from the measured values as the aspect ratio.

Specifically the length A along the major axis and the length B along the minor axis are measured as follows. Namely in a projected image of a first particle observed using a microscope, among pairs of parallel tangent lines externally touching the outline of a first particle, a tangent line a1 and a tangent line a2 having the longest distance therebetween are selected, and the distance between the tangent line a1 and the tangent line a2 is defined as the length A. Further, among pairs of parallel tangent lines externally touching the outline of a first particle, a tangent line b1 and a tangent line b2 having the shortest distance therebetween are selected, and the distance between the tangent line b1 and the tangent line b2 is defined as the length B.

The structure of the aggregate graphite particle is porous and having pores. This improves the rate performance of a battery constituted therewith. This is conceivably because a lithium ion can easily diffuse in a particle due to the presence of internal vacancies, and therefore the rate performance is improved.

The structure of the aggregate graphite particle is preferably a porous particle with such a low porosity that the second particle cannot penetrate into the core part. With such a particle, a composite particle formed therewith can achieve a high tap density, and the electrode density of a formed electrode can be enhanced so that high volumetric capacity can be achieved.

A value of the average interplanar spacing ($d_{002}$) of an aggregate graphite particle measured according to Gakushin method is preferably from 0.335 nm to 0.338 nm, more preferably from 0.335 nm to 0.337 nm, and further preferably from 0.335 nm to 0.336 nm, from a viewpoint of battery capacity. When the average spacing is 0.338 nm or less, the crystallinity of graphite is high, and both the battery capacity and the charge and discharge efficiency tend to be improved. Meanwhile, since the theoretical value for a graphite crystal is 0.335 nm, both the battery capacity and the charge and discharge efficiency tend to be improved when the average interplanar spacing is closer to this value.

Although there is no particular restriction on the volume average particle size (50% D) of an aggregate graphite particle, it is preferably larger than the second particle described below, and preferably from 5 μm to 40 μm, more preferably from 5 μm to 35 μm, further preferably from 7 μm to 30 μm, and still more preferably from 10 μm to 30 μm.

When the volume average particle size is 5 μm or more, excessive enlargement of the specific surface area is suppressed, so that the first-time charge and discharge efficiency is improved. The electrode density is also improved and a high capacity lithium ion secondary battery can be produced. Meanwhile, when the volume average particle size is 40 μm or less, electrode properties such as rate performance tend to be improved.

(Production Method for Aggregate Graphite Particle)

There is no particular restriction on a production method for the aggregate graphite particle, as long as a predetermined structure is formed. For example, an aggregate graphite particle may be obtained by adding 1 mass % to 50 mass % of a graphitization catalyst with respect to the total amount to at least one selected from the group consisting of a graphitizable aggregate and graphite, and a graphitizable binder (organic binding agent), followed by mixing, calcining and pulverizing. In this way, pores are formed owing to the removal of a graphitization catalyst, and a good property as an aggregate graphite particle is imparted. Further, an aggregate graphite particle may be regulated to have a desired configuration by selecting appropriately a mixing method of graphite or an aggregate and a binder, tuning of a blend ratio of a binder or the like, a pulverization condition after the calcination, or the like.

There is no particular restriction on the graphitizable aggregate, as long as it is a graphitizable powder material. For example, a coke powder, or a carbonized resin may be used. Among others, a coke powder such as needle coke, which is easily graphitized, is preferable. Further, there is no particular restriction on graphite, as long as it is powdery. For example, a natural graphite powder, or an artificial graphite powder may be used. The volume average particle size of graphitizable aggregate or graphite is preferably less than the volume average particle size of the aggregate graphite particle, and more preferably ⅔ or less of the volume average particle size of an aggregate graphite particle. In addition, the graphitizable aggregate or the graphite is preferably a flat particle.

As the graphitization catalyst, graphitization catalysts based on a metal, such as iron, nickel, titanium, silicon, or boron, a carbide thereof, an oxide thereof, or the like may be used. Among others, a carbide or an oxide of silicon or boron is preferable. The addition amount of such a graphitization catalyst is preferably in a range of from 1 to 50 mass %, more preferably in a range of from 5 to 40 mass % and further preferably in a range of from 5 to 30 mass %, with respect to the aggregate graphite particle to be yielded. When the addition amount of a graphitization catalyst is 1 mass % or more, enlargement of the aspect ratio and the specific surface area of an aggregate graphite particle is suppressed, and the growth of a graphite crystal tends to be improved. While, when it is 50 mass % or less, it is preferable, because the catalyst can be mixed homogeneously easily and the operability is not impaired.

There is no particular restriction on the binder (organic binding agent), as long as it can be graphitized by calcination. Examples of the binder include tar, pitch and an organic material such as a heat-curable resin or a thermoplastic resin. The blending amount of a binder with respect to a flat graphitizable aggregate or graphite is preferably from 5 mass % to 80 mass %, more preferably from 10 mass % to 80 mass %, and further preferably from 15 mass % to 80 mass %. When the addition amount of a binder is adjusted to an appropriate amount, excessive enlargement of the aspect ratio or the specific surface area of an aggregate graphite particle to be produced can be inhibited.

There is no particular restriction on a mixing method for a graphitizable aggregate or graphite with a binder, and for example they are mixed using a kneader. It is preferable to mix them at a temperature equal to or higher than the softening temperature of the binder. Specifically, in a case in which the binder is pitch or tar, 50° C. to 300° C. is preferable, and in a case in which the binder is a heat-curable resin, 20° C. to 100° C. is preferable.

Next, the mixture of a graphitizable aggregate or graphite and a binder is calcined for a graphitization treatment. Before the graphitization treatment, the mixture may be formed to a predetermined shape. Alternatively, after the shape formation, the mixture may be pulverized before the graphitization treatment, and after the particle size or the like is adjusted, then the graphitization treatment may be conducted. The calcination is conducted preferably under the conditions in which the mixture is hardly oxidized. Examples of thereof include calcination in a nitrogen atmosphere, in an argon gas atmosphere, or in vacuum. The temperature of a graphitization treatment is preferably 2000° C. or more, more preferably 2500° C. or more, and further preferably from 2800° C. to 3200° C.

When the temperature of the graphitization treatment is 2000° C. or more, a graphite crystal grows well, and the discharge capacity tends to be improved. Further, remaining of the added graphitization catalyst in a produced aggregate graphite particle can be suppressed. When a graphitization catalyst remains in an aggregate graphite particle, the discharge capacity may decrease occasionally. Therefore, remaining of the same should be preferably suppressed. While, when the temperature of a graphitization treatment is 3200° C. or less, sublimation of graphite can be suppressed.

When the particle size is not adjusted before a graphitization treatment, it is preferable to pulverize the yielded graphitized product into a desired volume average particle size, in order to adjust the particle size of the aggregate graphite particle. There is no particular restriction on a pulverization method, and examples thereof include well known methods using a jet mill, a vibration mill, a pin mill, a hammer mill, or the like.

By the above production method, a graphite particle having pores, namely an aggregate graphite particle can be produced by assembling or binding plural flat particles aligning orientation planes nonparallel.

Further, the details of the production method may be referred to, for example, Japanese Patent No. 3285520 and Japanese Patent No. 3325021.

(Second Particle)

The negative electrode material for a lithium ion secondary battery according to the present invention includes at least one second particle containing a silicon atom. There is no particular restriction on the second particle, as long as it contains a silicon atom. Examples thereof include a particle containing silicon and a particle containing a silicon compound such as silicon oxide. From a viewpoint of battery capacity, a particle containing silicon or silicon oxide is preferable, and a particle substantially consisting of silicon or a particle substantially consisting of silicon oxide is more preferable.

In this regard, the expression of "substantially" means that inevitably mixed impurity is allowed, and the impurity content in a second particle is preferably 10 mass % or less.

Although there is no particular restriction on the volume average particle size of the second particle, the volume average particle size is preferably less than the volume average particle size of the first particle, and is more preferably from 0.01 μm to 5 μm, further preferably from 0.03 μm to 3 μm, still more preferably from 0.05 μm to 2 μm, and particularly preferably from 0.1 μm to 1 μm.

When the volume average particle size of the second particle is 0.01 μm or more, a second particle can be produced with good productivity, the handling property is good, and the combining thereof onto the surface of the first particle can be carried out efficiently. While, when the volume average particle size is 5 μm or less, the combining thereof onto the surface of the first particle can be carried out efficiently, localization of expansion of a second particle at the time of charging can be suppressed, and consequently the cycle performance tends to be improved.

The silicon oxide is generally expressed by $SiO_x$. The range of x is preferably $0.8 \leq x \leq 1.6$, more preferably $0.9 \leq x \leq 1.5$, and further preferably $1.0 \leq x \leq 1.4$. When x is 0.8 or more, the silicon oxide can be easily produced or easily available. While, when x is 1.6 or less, excessive presence of the silicon dioxide portion in silicon oxide can be suppressed, and diffusion of a lithium ion in silicon oxide is promoted, whereby the rate performance tends to be improved.

There is no particular restriction on the ratio of the volume average particle size of the second particle to the volume average particle size of the first particle (volume average particle size of second particle/volume average particle size of first particle). It is preferably from 0.0003 to 0.2, and more preferably from 0.001 to 0.1, from the viewpoints of cycle performance and battery capacity.

Further, in the observation of a cross-section of the composite particle, the ratio of the length of the major axis of a second particle to the length of the major axis of a composite particle (length of the major axis of second particle/length of the major axis of composite particle; hereinafter also referred to as "major axis length ratio") is preferably from 0.0003 to 0.2, and more preferably from 0.001 to 0.1, from the viewpoints of cycle performance and battery capacity. Further, when cross-sections of randomly selected 10 composite particles are examined by observation, it is preferable that 5 or more composite particles satisfy the above-mentioned condition, and particularly preferable that all of the particles satisfy the above-mentioned condition.

The length of the major axis of a second particle may be determined similarly as the length of the major axis of a composite particle. When plural second particles exist in a composite particle, the length of the major axis of second particle is defined as an arithmetic mean value of the lengths of the major axis of randomly selected 3 second particles.

There is no particular restriction on the content of a second particle included in a composite particle, and it may be selected appropriately according to the purpose. From the viewpoints of cycle performance and battery capacity, it is preferably from 0.5 mass % to 20 mass %, more preferably from 1 mass % to 15 mass %, and further more preferably from 2 mass % to 10 mass %, with respect to the total composite particle. When the content of the second particle is 0.5 mass % or more, the battery capacity is improved. When it is 20 mass % or less, the cycle performance is improved.

Further, although the ratio of the content of the second particle to the content of the first particle in a composite particle (content of second particle/content of first particle) may be selected appropriately according to the purpose, it is preferably from 0.005 to 0.3 by mass, and more preferably from 0.01 to 0.25, from the viewpoints of cycle performance and battery capacity.

(Carbonic Substance B)

The composite particle according to the present invention is obtained by combining the first particle and the second particle with at least one carbonic substance B different from the carbonic substance A. The carbonic substance B is derived from an organic material as a precursor, and there is no particular restriction on the kind of the organic material to be used as a precursor, the history of a heat treatment, the structure of the carbonic substance B, or the like, as long as the carbonic substance B is derived from an organic material as a precursor by carbonization through a heat treatment or the like.

Examples of the organic material include a polymer such as a phenol resin or a styrene resin, and a carbonizable solid such as pitch. These may be used in a dissolved form or in a solid state as a binder used in the combining.

The composite particle according to the present invention may be produced by combining a first particle and a second particle with a precursor for a carbonic substance B, and then carbonizing the precursor.

The content of the carbonic substance B in the composite particle is preferably from 1 mass % to 10 mass %, more preferably from 1 mass % to 8 mass %, further preferably from 2 mass % to 8 mass %, and particularly preferably from 2 mass % to 6 mass %, with respect to the total composite particle.

When the content of the carbonic substance B is 10 mass % or less, the content of amorphous carbon can be suppressed, and the decrease in the first-time charge and discharge efficiency can be suppressed. Further, in a production step for a composite particle, binding between composite particles can be suppressed, whereby excessive increase in particle size can be suppressed. While, when it is 1 mass % or more, the cycle performance tends to be improved. This is conceivably because, for example, the second particle can be thereby combined more efficiently onto the surface of a first particle.

Further, there is no particular restriction on the ratio of the content the carbonic substance B to that of the second particle (carbonic substance B/second particle), as long as the first particle and the second particle are capable of being combined. For example, from the viewpoints of cycle performance and battery capacity, it is preferably from 0.1 to 10, and more preferably from 0.3 to 5, in terms of mass.

There is no particular restriction on the volume average particle size (50% D) of a composite particle according to the present invention. For example, it is preferably from 5 µm to 40 µm, more preferably from 5 µm to 35 µm, further preferably from 7 µm to 30 µm, and particularly preferably from 10 µm to 30 µm.

When the volume average particle size of a composite particle is 5 µm or more, excessive enlargement of the specific surface area can be suppressed, and the first-time charge and discharge efficiency is improved. Further, the electrode density can be easily increased, and high capacity of a lithium ion secondary battery can be achieved. Meanwhile, when the volume average particle size is 40 µm or less, electrode properties, such as the rate performance, tend to be improved.

There is no particular restriction on the ratio of the volume average particle size of the composite particle to the volume average particle size of the first particle (particle size of composite particle/particle size of first particle). It is preferably from 1.0 to 1.3, more preferably from 1.01 to 1.25, further preferably from 1.03 to 1.20, and particularly preferably from 1.05 to 1.15, from the viewpoints of cycle performance and battery capacity. When the volume average particle size of the composite particle is 1.0-fold or larger, the composite particle tends to be maintained without destruction with high probability, while when it is 1.3-fold or smaller, binding between composite particles is limited and each composite particle tends to exist independently, which are preferable respectively.

The volume average particle size of the composite particle is measured using a laser diffraction particle size distribution measuring apparatus under usual conditions. The volume average particle size of the composite particle may be regulated by selecting appropriately crushing conditions in a production process for a composite particle described below.

There is no particular restriction on the tap density of the composite particle. For example, it is preferably from 0.6 g/cm$^3$ to 1.2 g/cm$^3$, more preferably from 0.7 g/cm$^3$ to 1.2 g/cm$^3$, further preferably from 0.8 g/cm$^3$ to 1.15 g/cm$^3$, and particularly preferably from 0.9 g/cm$^3$ to 1.1 g/cm$^3$.

When the tap density is 0.6 g/cm$^3$ or higher, the cycle performance is improved; further the compaction property at the time of pressing for forming a negative electrode is improved and high electrode density can be achieved, whereby a high capacity battery can be produced. Meanwhile, when it is 1.2 g/cm$^3$ or lower, deterioration in battery properties can be suppressed. This is presumably because the particle size of the composite particle or the density of the composite particle itself has influence on the transfer and diffusion of a Li ion.

The tap density of the composite particle is measured according to JIS R1628.

[Substance Having Electrical Conductivity]

The negative electrode material for a lithium ion secondary battery preferably contains at least one substance having electrical conductivity, in addition to the composite particle.

Examples of a substance having electrical conductivity include carbon black, graphite, coke, carbon fiber, and carbon nanotube.

The kind, shape, or the like of the substance having electrical conductivity may be appropriately selected according to the purpose. For example, graphite and the like are preferable in terms of battery capacity, and charge and discharge efficiency, and carbon fiber, carbon nanotube and the like are preferable because the electrical conductivity between composite particles can be secured by a small amount of the same.

The content of the substance having electrical conductivity in a negative electrode material for a lithium ion secondary battery may be appropriately selected according to the purpose. For example, from a viewpoint of capacity, the content in a negative electrode material for a lithium ion secondary battery is preferably from 0.1 mass % to 20 mass %, and more preferably from 0.5 mass % to 10 mass %. Meanwhile, from a viewpoint of cycles, it is preferably from 20 mass % to 95 mass %, and more preferably from 50 mass % to 90 mass %.

[Production Process for Negative Electrode Material for Lithium Ion Secondary Battery]

There is no particular restriction on a production method for the negative electrode material for a lithium ion secondary battery, as long as a negative electrode material for a lithium ion secondary battery containing the composite particle can be produced. The method may include, for example, a step of obtaining the composite particle, and, if necessary, another step.

From the viewpoints of cycle performance of a battery and expansion rate of a negative electrode material, the step of obtaining the composite particle according to the present invention preferably includes a step of combining a first particle containing a carbonic substance A and a second particle containing a silicon atom using a carbonic substance B different from the carbonic substance A, to thereby obtain a composite particle whose volume average particle size is from 1.0 times to 1.3 times the volume average particle size of the first particle.

By producing the composite particle in such a step, the content of silicon atom in the rim part of the composite particle may be made twice or higher the content thereof in the core part. Further, a situation in which the silicon atom is substantially absent in the core part of the composite particle may be achieved.

Specifically, a step of obtaining the composite particle include preferably: a step of combining a first particle containing a carbonic substance A, a second particle containing silicon, and a carbonic substance precursor of a carbonic substance B different from the carbonic substance A; a step of calcining the combined product yielded by the combining, to thereby obtain an aggregated product; and a step of applying a shearing force to the aggregated product, to thereby obtain a composite particle having a volume average particle size from 1.0 times to 1.3 times the volume average particle size of the first particle, and containing the first particle and the second particle combined by the carbonic substance B.

(Combining)

There is no particular restriction on the combining of the first particle, the second particle, and the carbonic substance precursor, as long as these components can be combined at a quantitative ratio that enables the composition ratio of the first particle, second particle and carbonic substance B in a composite particle to be obtained by the present production method. By the combining, a combined product containing a first particle, a second particle, and a carbonic substance precursor may be obtained. In this regard, the combined product obtained in the combining step is an integrated product of a second particle and a carbonic substance precursor on the surface of a first particle, namely an uncarbonized combined product, in which the carbonic substance precursor is not yet carbonized.

In order to suppress the combining of only the second particle and the carbonic substance precursor and to form surely the uncarbonized combined product, it is preferable that the second particle and the carbonic substance precursor in a dissolved or dispersed state in a dispersing medium are mixed with the first particle.

As a dispersing medium used for preparing a dispersion, an organic solvent is preferable. By this means, for example, oxidation of the second particle can be suppressed. Further, when the carbonic substance precursor is a solid, a state dissolved in the organic solvent is preferable. Although there is no particular restriction on the organic solvent to be used, when, for example, pitch or the like is used as the carbonic substance precursor, an aromatic hydrocarbon solvent, such as toluene or methylnaphthalene, having solubility to the carbonic substance precursor is favorable.

In order to combine the second particle and the carbonic substance precursor, which have aggregating nature, homogeneously on the surface of the first particle, the second particle and the carbonic substance precursor are preferably dispersed highly in a dispersing medium. Although there is no particular restriction on the dispersing method, an ultrasonic dispersing treatment of the second particle, carbonic substance precursor and dispersing medium is preferable, because a more homogeneous dispersion can be prepared.

In preparing a dispersion, the first particle may be mixed simultaneously. In this case, there is no particular restriction on the dispersing method, as long as the first particle is not pulverized during the dispersing. For example dispersing may be carried out using an agitation type homogenizer, a bead mill, a ball mill, or the like.

When the first particle and the dispersion containing the second particle and the carbonic substance precursor are mixed, the composition of the negative electrode material to be obtained is determined depending on the amounts of the carbonic substance precursor and the second particle in the dispersion, and the composition of a carbonic substance A contained in the first particle.

When the carbonic substance precursor is changed to a carbonized product by a calcination treatment, the mass thereof reduces. Consequently, as for the amount of the carbonic substance precursor for the combining, it is preferable that the carbonization percentage is measured in advance and the amount corresponding to the amount of carbon to be left in a composite particle is used for a combining treatment. Namely, first setting an amount of a carbonic substance B corresponding to the amount of the carbonic substance B in a composite particle, and the amount of a carbonic substance precursor, which is determined by taking into consideration the above carbonization percentage, should be used for the combining. The amount of a carbonic substance B in a composite particle is as described above.

The amount of a second particle is one of the determining factors of the capacity of a lithium ion secondary battery constituted by using a negative electrode material according to the present invention. Consequently, depending on a target capacity, the amount of a second particle to be used for the combining should preferably be decided appropriately.

Specifically, it should preferably be selected appropriately so that the content of a second particle in a composite particle falls within the above ranges.

The amount of a first particle used for the combining should be set at the amount of a first particle equivalent to the amount of a first particle in a composite particle. For example, it is preferable to select appropriately an amount within a range from 60 mass % to 99 mass % of the total mass of a composite particle There is no particular restriction on a specific method of combining the first particle, the second particle, and the carbonic substance precursor. For example, when a dispersion containing a second particle, a carbonic substance precursor and an organic solvent is combined with a first particle, examples of the method include a method in which the dispersion and the first particle are mixed in a heatable kneader for the combining while evaporating the organic solvent, and a method in which the first particle is mixed with the dispersion previously, and the mixture is spray-dried to conduct the combining.

In the combining methods, in order to mix the first particle and the dispersion homogeneously, they are preferably mixed in a state of a paste or a slurry.

(Calcination Step)

In a calcination step, the combined product obtained in the combining step is subjected to a calcination treatment. The carbonic substance precursor is changed by the calcination treatment to a carbonized product, whereby the first particle and the second particle are integrated. When the second particle contains silicon oxide, for example, silicon oxide is disproportionated to form a structure in which microcrystals of silicon are dispersed in silicon oxide.

By the calcination treatment, the combined product is calcined to yield an aggregated product. In this regard, the aggregated product is an assembled, and integrated composite particles including a first particle, a second particle and a carbonic substance B.

The calcination treatment is preferably carried out in an inert atmosphere for the sake of suppressing oxidation. As an inert atmosphere, nitrogen or argon is suitable.

Although there is no particular restriction on calcination treatment conditions, it is preferable to retain an object at 200° C. for a certain time period for evaporating a remaining solvent, followed by increasing the temperature to a target temperature.

The calcination temperature is preferably from 800° C. to 1200° C., more preferably from 850° C. to 1200° C., and further preferably from 900° C. to 1200° C. When the calcination temperature is 800° C. or higher, carbonization of the carbonic substance precursor advances adequately, and the first-time charge and discharge efficiency tends to be improved. Meanwhile, when the calcination temperature is 1200° C. or lower, formation of silicon carbide from silicon can be suppressed, and decrease in battery capacity tends to be suppressed. Further, growth of a silicon dioxide portion in silicon oxide can be suppressed, and obstruction of diffusion of a lithium ion in silicon oxide and decrease in rate performance can be suppressed.

(Shearing Force Application Step)

In a shearing force application step, a shearing force is applied to the aggregated product obtained in the calcination step, to thereby obtain a composite particle having a volume average particle size from 1.0 times to 1.3 times the volume average particle size of the first particle and containing the first particle and the a second particle combined by the carbonic substance B.

The aggregated product obtained in the calcination step is composed of composite particles mutually bonded by carbonization of the carbonic substance precursor. When a shearing force is applied to the aggregated product, an appropriate shearing force is applied to mutually bonded composite particles to divide them into individual composite particles having specific particle sizes. The thus-obtained composite particles have a form in which a relatively larger amount of second particles are distributed at the surface thereof.

There is no particular restriction on the shearing force application means, as long as it is an apparatus capable of applying a shearing force for making the volume average particle size of a composite particle in a desired range. Examples thereof include a conventional apparatus, such as a mixer, a cutter mill, a hammer mill, or a jet mill.

Although the conditions for applying such a shearing force as is necessary for making the volume average particle size of a composite particle within a desired range are different depending on the apparatus to be used, in a case, for example, of a WARING mixer (7012S) made by Waring, the shearing conditions are as follows: the rotation rate is from 3000 rpm to 13000 rpm, and the duration is from 30 sec to 3 min.

With respect to the application of a shearing force, any of treatments commonly used in the present technical field, such as a pulverizing treatment or a crushing treatment, may be applied, as long as it is a treatment which makes an aggregated product to a state of individually separated composite particles having constituted the aggregated product without destroying the composite particles.

A composite particle obtained through the shearing force application step is a composite particle of the first particle and the second particle combined with the carbonic substance B, and has a volume average particle size from 1.0 times to 1.3 times the volume average particle size of the first particle.

When the volume average particle size of the composite particle is 1.0 times or larger the volume average particle size of the first particle, destruction of a target composite particle is suppressed, and an integrated state of the second particle with the first particle is achieved. As the result, the electrical conductivity can be maintained sufficiently over cycles and the cycle property is improved. Meanwhile, when the volume average particle size of the composite particle is 1.3 times or smaller the volume average particle size of the first particle, excessive formation of an aggregated product with mutually bonded composite particles is suppressed, and the presence of the second particle in the inner part of the aggregated product is suppressed. As the result, when cubical expansion of a second particle occurs at the time of charging, excessive expansion of the aggregated product can be suppressed.

(Other Steps)

The production method for a negative electrode material for a lithium ion secondary battery may include, if necessary, steps other than the combining step, the calcination step and the shearing force application step.

For example, it is preferable to have a classification step after the shearing force application step, for the purpose of particle size adjustment. By this means, a composite particle having a homogeneous particle size may be yielded. For the classification treatment, for example, a sieve having an opening of 40 μm is preferably used. Further, it is preferable to remove fine powders of 1 μm or less as much as possible by the classification treatment.

There is no particular restriction on a method of the classification treatment. For example, removal using an air classifier is possible.

A heat treatment step may be included after the classification step, in which the composite particle treated by the classification treatment is further subjected to a heat treatment in an inert atmosphere. The heat treatment conditions are similar to the calcination conditions. By this treatment, the structure of a particle surface, which has been disordered by crushing, may be smoothened, and the first-time charge and discharge efficiency can be improved.

The production method for a negative electrode material for a lithium ion secondary battery may further include a carbon coating step after the heat treatment step. By the carbon coating step, the composite particle is provided with a carbon coating forming additionally a low crystallinity carbon layer. The amount of the carbon coating is preferably decided appropriately so as not to deteriorate the properties of the negative electrode material by decrease in the first-time charge and discharge efficiency due to increase of amorphous carbon.

Examples of the method for carbon coating include a wet mixing method, a chemical vapor deposition method, and a mechanochemical method. A chemical vapor deposition method and a wet mixing method are preferable, from the viewpoints of homogeneity, easiness of the control of a reaction system, and retention of a composite particle shape.

There is no particular restriction on a carbon source for forming a low crystallinity carbon layer. For example, for a chemical vapor deposition method, an aliphatic hydrocarbon, an aromatic hydrocarbon, or an alicyclic hydrocarbon may be used. Specific examples thereof include methane, ethane, propane, toluene, benzene, xylene, styrene, naphthalene, cresol, anthracene, and derivatives thereof.

For a wet mixing method and a mechanochemical method, a polymer, such as a phenolic resin or a styrene resin, or a carbonizable solid such as pitch may be used for the treatment as it is, as a solid or in a form of a dispersion.

As for the treatment temperature, the same condition as described above as the calcination treatment condition may preferably be used.

The production method may further include, according to need, a step of mixing another component. Examples of another component include the substance having electrical conductivity (electroconductive auxiliary material) described above, and a binder.

<Negative Electrode for Lithium Ion Secondary Battery>

A negative electrode for a lithium ion secondary battery according to the present invention includes a current collector and a negative electrode material layer which is provided on the current collector and contains the negative electrode material for a lithium ion secondary battery according to the present invention described above, and may further include another component according to need. According to the above, a lithium ion secondary battery, which has a high capacity and is superior in cycle performance and safety, may be constituted.

The negative electrode for a lithium ion secondary battery may be obtained, for example, by kneading the negative electrode material for a lithium ion secondary battery according to the present invention, and an organic binding agent, together with a solvent in a dispersing apparatus, such as a stirrer, a ball mill, a super sand mill, or a pressurized kneader, to prepare a negative electrode material slurry, and coating the same to a current collector, to thereby form a negative electrode material layer; or by shaping a paste of the negative electrode material slurry into a sheet form, a pellet form, or the like and integrating the same with a current collector.

There is no particular restriction on the organic binding agent (hereinafter also referred to as "binder"), and examples thereof include a styrene-butadiene copolymer; (meth)acrylic copolymers derived from an ethylenic unsaturated carboxylic acid ester (for example, methyl(meth)acrylate, ethyl(meth)acrylate, butyl(meth)acrylate, (meth)acrylonitrile, and hydroxyethyl(meth)acrylate), or an ethylenic unsaturated carboxylic acid (for example, acrylic acid, methacrylic acid, itaconic acid, fumaric acid, and maleic acid); and polymers such as polyvinylidene fluoride, polyethylene oxide, polyepichlorohydrin, polyphosphazene, polyacrylonitrile, polyimide, or polyamide imide.

The organic binding agents may be in a form dispersed or dissolved in water, or dissolved in an organic solvent such as N-methyl-2-pyrrolidone (NMP), depending on the respective material properties. Among others, in view of superior adhesiveness, an organic binding agent having the main skeleton of at least one selected from the group consisting of polyacrylonitrile, polyimide, and polyamide imide, is preferable; and in view of a low heat treatment temperature and superior electrode flexibility, an organic binding agent having a polyacrylonitrile main skeleton is more preferable. As an organic binding agent having a polyacrylonitrile main skeleton, for example, a product (LSR7, by Hitachi Chemical Co., Ltd.), in which acrylic acid imparting adhesiveness and a straight chain ether group imparting flexibility are added to the polyacrylonitrile skeleton, may be used.

The content of the organic binding agent in a negative electrode layer of a negative electrode for a lithium ion secondary battery is preferably from 1 mass % to 30 mass %, more preferably from 2 mass % to 20 mass %, and further preferably from 3 mass % to 15 mass %.

When the content of the organic binding agent is 1 mass % or more, the adhesiveness is good, and destruction of a negative electrode by expansion and contraction in charging and discharging is suppressed. Meanwhile, when it is 30 mass % or less, increase in electrode resistance can be suppressed.

An electroconductive auxiliary material may be added according to need to the negative electrode material slurry. Examples of an electroconductive auxiliary material include carbon black, graphite, acetylene black, and an oxide or nitride having electrical conductivity. The content of the electroconductive auxiliary material may be approximately from 0.1 mass % to 20 mass % with respect to the negative electrode material for a lithium ion secondary battery material according to the present invention.

There is no particular restriction on the material and the shape of the current collector, and aluminum, copper, nickel, titanium, stainless steel, or the like, which is formed into a band form, such as a foil form, a perforated foil form, or a mesh form, may be used. Further, a porous material, such as a porous metal (foamed metal) or a carbon paper, may be used.

There is no particular restriction on a method of coating the negative electrode material slurry to a current collector, and examples thereof include well known methods, such as a metal mask printing method, an electrostatic coating method, a dip coating method, a spray coating method, a roll coating method, a doctor blade method, a gravure coating method, and a screen printing method. After the coating, if necessary, a rolling treatment using a flat-plate plate press, a calender roll, or the like is preferably carried out.

Integration of the negative electrode material slurry shaped into a sheet form, a pellet form, or the like with a current collector may be carried out by a well-known method such as rolling, pressing, or a combination thereof.

The negative electrode material layer formed on the current collector, and the negative electrode layer integrated with the current collector are preferably heat-treated depending on the organic binding agent used. For example, when an organic binding agent having a polyacrylonitrile main skeleton is used, a heat treatment is preferably carried out at a temperature from 100° C. to 180° C., and when an organic binding agent having a polyimide or polyamide-imide main skeleton is used, a heat treatment is preferably carried out at a temperature from 150° C. to 450° C.

By the heat treatment, the strength is highly intensified through removal of a solvent and curing of a binder, and the adhesiveness between particles and between a particle and a current collector can be improved. The heat treatment is preferably carried out in an inert atmosphere, such as helium, argon, or nitrogen, or in a vacuum atmosphere, in order to prevent oxidization of the current collector during the treatment.

The negative electrode may preferably be pressed (pressure treatment) before the heat treatment. By the pressure treatment, the electrode density can be adjusted. The electrode density of the negative electrode material for a lithium ion secondary battery is preferably from 1.4 g/cm$^3$ to 1.9 g/cm$^3$, more preferably from 1.5 g/cm$^3$ to 1.85 g/cm$^3$, and further preferably from 1.6 g/cm$^3$ to 1.8 g/cm$^3$. The higher the electrode density is, the more the volumetric capacity is improved, and further the adhesiveness is improved, and also the cycle performance tends to be improved.

<Lithium Ion Secondary Battery>

A lithium ion secondary battery according to the present invention is characterized in that it includes the negative electrode for a lithium ion secondary battery according to the present invention, a positive electrode, and an electrolyte. For example, a lithium ion secondary battery may be constituted by placing the negative electrode for a lithium ion secondary battery and a positive electrode face to face, with a separator therebetween if necessary, and by injecting therein an electrolytic solution containing an electrolyte.

The positive electrode may be obtained similarly as the negative electrode by forming a positive electrode material layer on a current collector surface. In this case, as a current collector, a metal such as aluminum, titanium, or stainless steel, or an alloy thereof in a belt form, such as a foil form, a perforated foil form or a mesh form, may be used.

There is no particular restriction on the positive electrode material to be used for the positive electrode material layer, and a metallic compound, in which doping or intercalation of a lithium ion is possible, a metallic oxide, a metal sulfide, or an electrical conductive polymer material may be used. For example, lithium cobaltate ($LiCoO_2$), lithium nickelate ($LiNiO_2$), lithium manganate ($LiMnO_2$), and a double oxide thereof ($LiCo_xNi_yMn_zO_2$, x+y+z=1, 0<x, 0<y; $LiNi_{2-x}Mn_xO_4$, 0<x≤2), lithium manganese spinel ($LiMn_2O_4$), a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M: Co, Ni, Mn, and Fe), an electrical conductive polymer such as polyacetylene, polyaniline, polypyrrole, polythiophene, and polyacene, or porous carbon may be used singly or in a combination thereof. Among others, lithium nickelate ($LiNiO_2$) and a double oxide thereof ($LiCo_xNi_yMn_zO_2$, x+y+z=1, 0<x, 0<y; $LiNi_{2-x}Mn_xO_4$, 0<x≤2) are suitable for a positive electrode material to be used according to the present invention because of high battery capacity.

As the separator, for example, nonwoven cloth, cloth, a microporous film, or a combination thereof using, as the main component, a polyolefin such as polyethylene or polypropylene may be used. In this connection, when a lithium ion secondary battery to be produced has a structure in which a positive electrode and a negative electrode do not contact directly, it is not necessary to use a separator.

As the electrolytic solution, for example, a so-called organic electrolytic solution may be used, for which a lithium salt such as $LiClO_4$, $LiPF_6$, $LiAsF_6$, $LiBF_4$, or $LiSO_3CF_3$ as an electrolyte is dissolved in a non-aqueous solvent composed singly or in a combination of two or more of ethylene carbonate, propylene carbonate, butylene carbonate, vinylene carbonate, fluoroethylene carbonate, cyclopentanone, sulfolane, 3-methylsulfolane, 2,4-dimethylsulfolane, 3-methyl-1,3-oxazolidin-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolane, methyl acetate, and ethyl acetate. Among others, an electrolytic solution containing fluoroethylene carbonate is favorable, because a stable SEI (solid electrolyte interface) tends to be formed therewith on the surface of a negative electrode material according to the present invention, and the cycle performance is improved significantly.

There is no particular restriction on the structure of a lithium ion secondary battery according to the present invention, and usually a positive electrode and a negative electrode, as well as a separator to be provided according to need, are wound up into a flat spiral form as a spirally wound electrode plate group, or laminated to a flat plate form as a laminated electrode plate group, and in general a structure encapsulating the electrode plate group in an outer package is constructed.

Although there is no particular restriction on the shape of a lithium ion secondary battery according to the present invention, it may be used as a paper battery, a button battery, a coin battery, a layer-built battery, a cylindrical battery, a rectangular battery, or the like.

Although the negative electrode material for the lithium ion secondary battery according to the present invention is described as for a lithium ion secondary battery, it may be applied generally to an electrochemical apparatus utilizing entry and elimination of a lithium ion as a charge and discharge mechanism, for example, to a hybrid capacitor.

EXAMPLES

The present invention will be described below more specifically by way of Examples, provided that the present invention be not limited to Examples. Meanwhile, "part(s)" and "%" indicate "part(s) by mass" and "% by mass", respectively, unless otherwise specified.

Example 1

Preparation of Composite Particle

First, a silicon powder having a volume average particle size of 25 μm (HiSi-300, purity 99.9%, manufactured by Toyo Kinzoku Fun Kabushiki Kaisha; second particle), methylnaphthalene, and a dispersing agent (L-1820, manufactured by Kao Corporation) were pulverized using a bead mill (LMZ, manufactured by Ashizawa Finetech Ltd.) to a volume average particle size of 0.2 μm, thereby preparing a silicon slurry.

Then, 500 g of the silicon slurry (solid content: 30%), 300 g of coal tar pitch (carbonization percentage: 50%; precursor of carbonic substance B), and 2000 g of methylnaphthalene were charged in a stainless steel vessel, and stirred, followed by an ultrasonic dispersing treatment using a flow-type ultrasonic homogenizer (GSD600HAT, manufactured by Ginsen Co., Ltd.) with circulation for 30 min., to thereby yield a dispersion.

Then, 2700 g of needle coke having a volume average particle size of 18 μm (carbonic substance A) and then the dispersion were charged into a pressurized kneader, and methylnaphthalene was evaporated at 200° C., thereby obtaining a combined product in which the carbonic substance A and the silicon particle were combined with the carbonic substance B.

The thus-obtained combined product was calcined in a calcination oven in a nitrogen atmosphere at 900° C. for 2 hours, to thereby yield an aggregated product. The thus-obtained aggregated product was crushed using a WARING mixer (7012S, manufactured by Waring) under the conditions of rotation rate of 3100 rpm, for 1 min., and then classified using a vibrating screen having an opening of 40 μm, thereby obtaining a composite particle having a volume average particle size of 20 μm, which was used as a negative electrode material for a lithium ion secondary battery.

With respect to the negative electrode material for a lithium ion secondary battery containing the composite particle yielded by the above production method, the content of silicon atom, the average interplanar spacing, the tap density, the BET specific surface area, the volume average particle size (50% D), the content of second particle, and the major axis length ratio were evaluated according to the following methods. The evaluation results are shown in Table 1. The symbol "-" in Table 1 means 'not evaluated'.

Figure 2:
FIG. 2 is a view showing an example of a rim part of a cross-sectional image of a composite particle according to Example 1 of the present invention.

FIG. 1 is an SEM image showing an entire cross-section of the yielded composite particle, FIG. 2 is an SEM image showing a rim part of a cross-section of the composite particle. The arrows in FIG. 2 indicate silicon particles.

[Cross-Section Observation and Quantitative Analysis]

For fabrication of an electrode cross-section, an ion milling apparatus (E-3500, manufactured by Hitachi High-Technologies Corporation) was used. The electrode cross-section fabricated by the same was observed using an SEM (S-3400N, manufactured by Hitachi High-Technologies Corporation) and simultaneously analyzed quantitatively using an EDX (INCA ENERGY 350, by Oxford Instruments plc.) with respect to a carbon atom, an oxygen atom and a silicon atom, and the contents of silicon atom in the entire composite particle, the rim part and the core part were determined, respectively, as the content ratio of silicon atom to the total content of carbon atom, oxygen atom and silicon atom.

The content of silicon atom in the entire composite particle was determined, by magnifying the length of the major axis of a composite particle of the observation subject approximately equal to the width of the observation region, as the content of silicon atom in the entire observation region. While, for the content of silicon atom in the rim part and the core part, 3 square regions with a side length of 1 μm were selected in the rim part and the core respectively avoiding overlapping as far as possible, and the contents were calculated as arithmetic mean values of the measured values in the respective square regions.

Further, the ratio of silicon atom in the rim part to that in the core part (surface/center) and the ratio of silicon atom in the rim part to that in the entire composite particle (center/total) were also calculated.

Further, in the cross-section observation, the major axis length ratio was calculated as the ratio of the length of the major axis of a second particle to the length of the major axis of a composite particle. Table 1 shows the values rounded off from the 3rd decimal place.

The length of the major axis of a second particle was determined as an arithmetic mean value of lengths of the major axis of 3 randomly selected second particles.

Ten each composite particles were measured, and it was found that all of the 10 composite particles in Examples satisfied the requirements according to the present invention. Consequently, the values in Table 1 are mean values of each 10 values. In each composite particle, 3 observation regions were selected respectively. Meanwhile, in each Comparative Example, all of each 10 composite particles did not satisfy the requirements according to the present invention. The values in Table 1 are also mean values of each 10 values.

[Measurement (XRD) of Average Interplanar Spacing $(d_{002})$]

Measurement was carried out using a wide-angle X-ray diffraction measuring apparatus (manufactured by Rigaku Corporation), and the average interplanar spacing ($d_{002}$) was calculated by Gakushin method.

[Measurement of Tap Density]

The tap density was measured by a method according to JIS-R1628.

[Measurement of BET Specific Surface Area]

Nitrogen adsorption was measured at 5 points in a relative pressure range from 0.04 to 0.20 using a nitrogen adsorption measuring apparatus ASAP-2010 (manufactured by Shimadzu Corporation), and a BET specific surface area was calculated by applying the BET method.

[Measurement of Average Particle Size (50% D)]

The obtained composite particle was dispersed together with a surfactant in purified water, and the dispersion was placed in a sample vessel of a laser diffraction particle size distribution measuring apparatus SALD-3000J (manufactured by Shimadzu Corporation), and measurement was carried out while circulating using a pump under an ultrasonic treatment. A particle size at which a cumulative volume from the small size side of the obtained particle size distribution reached 50% was defined as a volume average particle size (50% D).

[Content of Second Particle]

The content of second particle contained in a composite particle was measured as follows. Three (3) g of the obtained composite particle was placed in an alumina crucible and heat-treated in the atmosphere at 900° C. for 60 hours. Deeming the yielded ash as oxidized totally, the content of silicon, or silicon oxide constituting the second particle was determined according to the following formulas.

Silicon content (%)=(ash amount×28.09/60.09)/composite particle mass×100

Silicon oxide content (%)=(ash amount×44.09/60.09)/composite particle mass×100

(Production of Negative Electrode for Lithium Ion Secondary Battery)

To 95 parts of the obtained composite particle, 5 parts of a resin having a main skeleton of polyacrylonitrile (LSR7, manufactured by Hitachi Chemical Co., Ltd.) was added as a binder. Then, the mixture was kneaded after adding an appropriate amount of NMP (N-methyl-2-pyrrolidone), followed by addition of NMP, thereby preparing a slurry having a solid content of 40%.

The thus-prepared slurry was applied by coating using an applicator on a copper foil at a solid content coating amount of 7 mg/cm², and dried for 2 hours in a drier operated at a constant temperature of 90° C. After the drying, the coated foil was roll pressed at a linear pressure of 1 t/cm, and further heat-treated in a vacuum at 160° C. for 2 hours, thereby obtaining a negative electrode for a lithium ion secondary battery. From the negative electrode for a lithium ion secondary battery, a 14 mmφ-disk was punched out for use as an evaluation sample.

(Production of Evaluation Cell)

An evaluation cell was produced by placing the negative electrode and metal lithium as a counter electrode face to face in a CR2016-type coin cell with a 20 μm-polypropylene separator arranged therebetween, and an electrolytic solution was injected therein. The electrolytic solution was prepared by dissolving $LiPF_6$ in a mixed solvent of ethyl carbonate and methyl ethyl carbonate with a volume ratio of 3/7 to the concentration of 1 mol/L, and adding 1.5 mass % of vinyl carbonate and then further 20 vol % of fluoroethylene carbonate.

(Evaluation Condition)

The evaluation cell was placed in a thermostat at 25° C. and subjected to a cycle test. Charging was carried out by charging at a constant current of 2 mA up to 0 V, and then at a constant voltage of 0 V until the current value reached 0.2 mA. Discharging was carried out at a constant current of 2 mA until the voltage value of 1.5 V. The discharge capacity and the charge and discharge efficiency were based on the results of the first charge and discharge test.

With respect to the expansion rate, an evaluation cell was disassembled at a charged condition after repeating 5 cycles of charging and discharging under the above conditions, and the ratio of the thickness of the thus-obtained negative electrode to the thickness of the negative electrode at production was used as the expansion rate.

Further, the cycle performance was evaluated by the capacity retention rate, which was determined by comparing a discharge capacity after 50 cycles of charging and discharging under the above charging and discharging conditions to the discharge capacity at the first cycle.

The evaluation results are shown in Table 1.

Example 2

A silicon oxide slurry was prepared by pulverizing a silicon oxide powder (SiO, SiO02PB, manufactured by Kojundo Chemical Lab. Co., Ltd.: second particle) instead of the silicon powder in Example 1 to have a volume average particle size of 0.5 μm. A composite particle was produced and evaluated in the same manner as in Example 1, except that 800 g of the silicon oxide slurry and 300 g of coal tar pitch were subjected to an ultrasonic dispersing treatment and combined with 2.61 kg of needle coke.

Example 3

A composite particle was produced and evaluated in the same manner as in Example 1, except that the aggregated product yielded by calcination in Example 1 was disintegrated using a jet mill (LJ-3, manufactured by Nippon Pneumatic Mfg. Co., Ltd.) under the conditions of a pulverization pressure of 0.1 MPa, and the classification zone clearance of 12 mm, using a large louver.

Example 4

A composite particle was produced and evaluated in the same manner as in Example 1, except that a negative electrode material for a lithium ion secondary battery was prepared by mixing a squamous graphite particle having an average particle size of 4 μm and a specific surface area of 14 m²/g, at 10% with respect to the total amount with the composite particle yielded in Example 1.

Example 5

Production of Composite Particle

A silicon oxide slurry was prepared by pulverizing a silicon oxide powder having a volume average particle size of 30 μm (SiO, SiO02PB, manufactured by Kojundo Chemical Lab. Co., Ltd.: second particle) together with methylnaphthalene, and a dispersing agent (L-1820, manufactured by Kao Corporation) in a bead mill (LMZ, manufactured by Ashizawa Finetech Ltd.) to have a volume average particle size of 0.5 μm.

Then, 500 g of the silicon slurry (solid content 30%), 300 g of coal tar pitch (carbonization percentage 50%, precursor of carbonic substance B), and 2000 g of methylnaphthalene were charged in a stainless steel vessel, and stirred, followed by an ultrasonic dispersing treatment using a flow-type ultrasonic homogenizer (GSD600HAT, manufactured by Ginsen Co., Ltd.) with circulation for 30 min, thereby obtaining a dispersion.

Next, 2700 g of spheroidized natural graphite having a volume average particle size of 20 μm and a circularity of 0.95 (spherical graphite particle, first particle) was charged into a pressurized kneader. Then, the dispersion was charged therein, and methylnaphthalene was evaporated at 200° C., thereby obtaining a combined product composed of spheroidized natural graphite, in which the silicon particle was combined with the carbonic substance.

The thus-obtained combined product was calcined in a calcination oven in a nitrogen atmosphere at 900° C., for 2 hours. The aggregated product obtained by the calcination was disintegrated using a WARING mixer (7012S, manufactured by Waring) under the conditions of a rotation rate of 3100 rpm, for 1 min, and then classified using a vibrating screen having an opening of 40 μm, thereby obtaining a composite particle having a volume average particle size of 22 μm, which was used as a negative electrode material for a lithium ion secondary battery.

With respect to the negative electrode material for a lithium ion secondary battery containing the composite particle obtained by the above production method, the content of silicon atom, the average interplanar spacing, the tap density, the BET specific surface area, the volume average particle size (50% D), and the content of second particle were evaluated in the same manner as in Example 1, and the circularity of first particle was evaluated as follows. The evaluation results are shown in Table 1.

[Circularity]

For a first particle, the circularity was determined by observing an image enlarged 1000-fold using a scanning electron microscope, selecting randomly 10 spherical graphite particles, measuring the circularity of each carbon particle, and calculating an arithmetic mean value using an image analysis software for particle analysis (available from Sumitomo Metal Technology, Inc.). In this regard, the circularity is a value obtained by dividing a circle perimeter calculated from an equivalent circle diameter, which is the diameter of a circle having the same area as a projected area of a spherical graphite particle, by a perimeter (length of the outline) measured from a projected image of a spherical graphite particle; and determined by the following formula. The circularity of a perfect circle is 1.00.

Circularity=(perimeter of equivalent circle)/(perimeter of particle cross-section image)

(Production of Negative Electrode for Lithium Ion Secondary Battery)

To 95 parts of the thus-obtained composite particle, 5 parts of a resin having a main skeleton of polyacrylonitrile (LSR7, manufactured by Hitachi Chemical Co., Ltd.) was added as a binder; the mixture was kneaded after adding an appropriate amount of NMP (N-methyl-2-pyrrolidone), followed by addition of NMP, thereby producing a slurry having a solid content of 40%.

The prepared slurry was applied by coating using an applicator on a copper foil at a solid content coating amount of 7 mg/cm$^2$, and dried for 2 hours in a drier operated at a constant temperature of 90° C. After the drying, the coated foil was roll pressed at a linear pressure of 1 t/cm, and further heat-treated in a vacuum at 160° C. for 2 hours, thereby obtaining a negative electrode for a lithium ion secondary battery. From the negative electrode for a lithium ion secondary battery, a 14 mmφ-disk was punched out for use as an evaluation sample.

(Production of Evaluation Cell)

An evaluation cell was produced by placing the negative electrode and metal lithium as a counter electrode face to face in a CR2016-type coin cell with a 20 μm-polypropylene separator arranged therebetween, and an electrolytic solution was injected therein. The electrolytic solution was prepared by dissolving LiPF$_6$ in a mixed solvent of ethyl carbonate and methyl ethyl carbonate with a volume ratio of 3/7 to the concentration of 1 mol/L, and adding 1.5 mass % of vinyl carbonate and then further 20 vol % of fluoroethylene carbonate.

(Evaluation Condition)

The evaluation cell was placed in a thermostat at 25° C. and subjected to a cycle test. Charging was carried out by charging at a constant current of 2 mA up to 0 V, and then at a constant voltage of 0 V until the current value reached 0.2 mA. Discharging was carried out at a constant current of 2 mA until the voltage value of 1.5 V. The discharge capacity and the charge and discharge efficiency were based on the results of the first charge and discharge test.

With respect to the expansion rate, an evaluation cell was disassembled at a charged condition after repeating 5 cycles of charging and discharging under the above conditions, and the ratio of the thickness of the thus obtained negative electrode to the thickness of the negative electrode at production was used as the expansion rate.

Further, the cycle performance was evaluated by the capacity retention rate, which was determined by comparing a discharge capacity after 50 cycles of charging and discharging under the above charging and discharging conditions to the discharge capacity at the first cycle.

The evaluation results are shown in Table 1.

Example 6

A composite particle was produced and evaluated in the same manner as in Example 5, except that a silicon powder having a volume average particle size of 25 μm (HiSi-300, purity 99.9%, manufactured by Toyo Kinzoku Fun Kabushiki Kaisha: second particle) instead of the silicon oxide powder in Example 5 was used, a silicon slurry was prepared by pulverizing the silicon powder to have a volume average particle size of 0.2 μm, and 200 g of the slurry together with 180 g of coal tar pitch was subjected to an ultrasonic dispersing treatment. The evaluation results are shown in Table 1.

Figure 3:
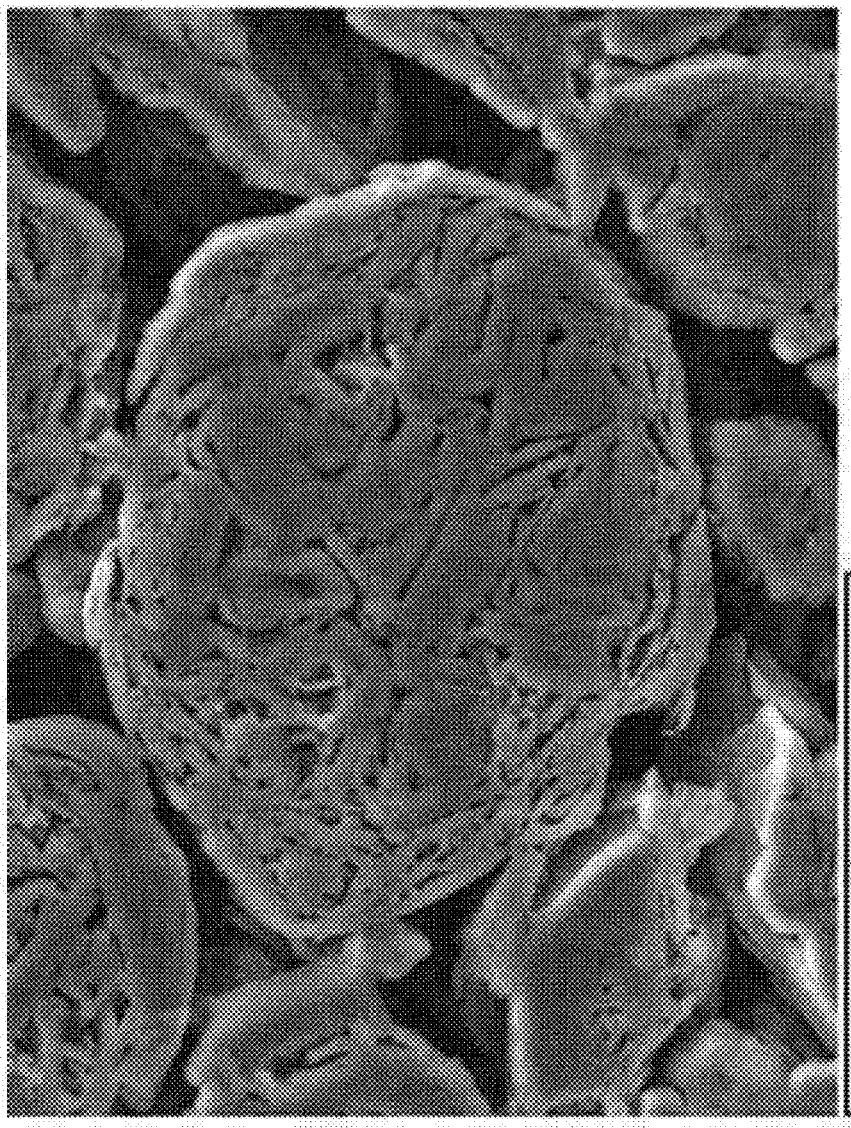
FIG. 3 is a view showing an example of a cross-section of a composite particle according to Example 6 of the present invention.
Figure 4:
FIG. 4 is a view showing an example of a core part of a cross-section of a composite particle according to Example 6 of the present invention.
Figure 5:
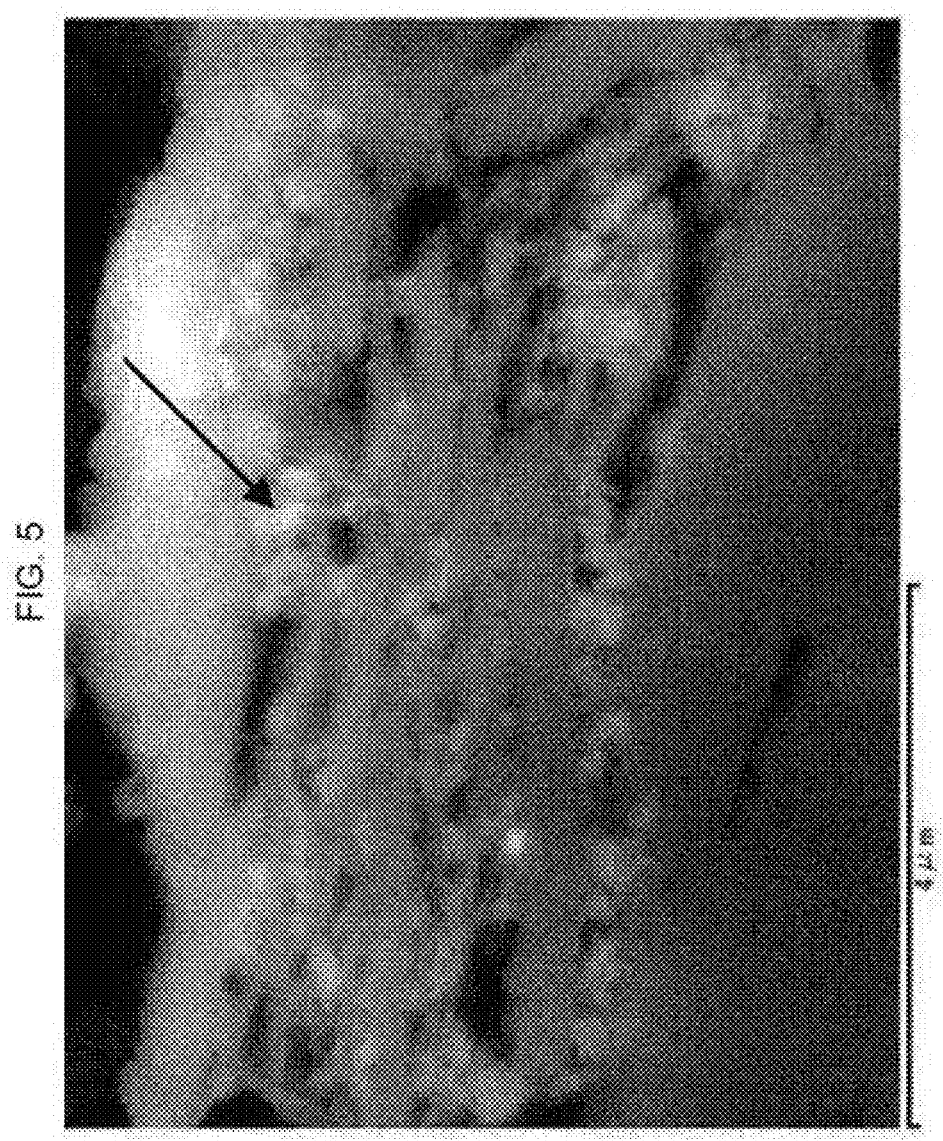
FIG. 5 is a view showing an example of a rim part of a cross-section of a composite particle according to Example 6 of the present invention.

FIG. 3 is an SEM image showing an entire cross-section of the obtained composite particle, FIG. 4 is an SEM image showing a core part of a cross-section of the composite particle, and FIG. 5 is an SEM image showing a rim part of a cross-section of the composite particle, respectively. The arrows in FIG. 5 indicate silicon particles.

It is obvious from FIG. 3 to FIG. 5 that in the composite particle according to Example 6, the silicon particle is present in the rim part but not present in the core part.

Example 7

A composite particle was produced in evaluated in the same manner as in Example 5, except that a granulated particle prepared as follows instead of the spheroidized natural graphite in Example 5 was used. The evaluation results are shown in Table 1.

—Preparation of Granulated Particle—

Squamous graphite having a volume average particle size of 8 μm in an amount of 980 g and 20 g of carboxymethylcellulose (WS-C, manufactured by Dai-Ichi Kogyo Seiyaku Co., Ltd.) were mixed with 3000 g of purified water with stirring. The slurry was granulated using a fluidized bed granulation apparatus (GPCG, manufactured by Powrex Corp.). The granulated particle was calcined in a nitrogen atmosphere at 900° C. for 2 hours, thereby obtaining a granulated particle having a volume average particle size of 24 μm and a circularity of 0.93.

Example 8

A composite particle was produced and evaluated in the same manner as in Example 5, except that the aggregated product obtained by the calcination in Example 5 was disintegrated using a jet mill (LJ-3, manufactured by Nippon Pneumatic Mfg. Co., Ltd.) under the conditions of a pulverization pressure of 0.1 MPa, and a classification zone clearance of 12 mm, using a large louver. The evaluation results are shown in Table 1.

Example 9

A composite particle was produced in evaluated in the same manner as in Example 5, except that a negative electrode material for a lithium ion secondary battery was prepared by mixing a squamous graphite particle having a volume average particle size of 4 µm and a specific surface area of 14 m$^2$/g, at 10% with respect to the total amount with the composite particle obtained in Example 5. The evaluation results are shown in Table 1.

Example 10

In Example 5, spheroidized natural graphite having a volume average particle size of 20 µm and a circularity of 0.95 was treated using a cold isotactic press at 100 MPa, thereby obtaining spheroidized natural graphite having a volume average particle size of 20 µm and a circularity of 0.86. A composite particle was produced and evaluated in the same manner as in Example 5, except that the thus-obtained spheroidized natural graphite was used. The evaluation results are shown in Table 1.

Example 11

Production of Composite Particle

A first particle (hereinafter also referred to as "aggregate graphite particle") was produced as follows.

Using a pressurized kneader, 2000 g of a coke powder having a volume average particle size of 10 µm, 800 g of coal tar pitch, 400 g of carbonized silicon, and 800 g of coal tar were kneaded at 100° C. for 1 hour. The yielded aggregated product was calcined in a nitrogen atmosphere at 900° C. for 2 hours, and then graphitized in the same atmosphere at 2800° C. for 2 hours. The graphitized aggregated product was pulverized using a jet mill, thereby producing a first particle having a volume average particle size of 23 µm and an aspect ratio of 1.5.

Next, a silicon oxide slurry was prepared by pulverizing a silicon oxide powder having a volume average particle size of 30 µm (SiO, SiO02PB, manufactured by Kojundo Chemical Lab. Co., Ltd.: second particle) together with methyl-naphthalene, and a dispersing agent (L-1820, manufactured by Kao Corporation) in a bead mill (LMZ, manufactured by Ashizawa Finetech Ltd.) to have a volume average particle size of 0.5 µm.

Then, 500 g of the silicon oxide slurry (solid content 30%), 300 g of coal tar pitch (carbonization percentage 50%, precursor of carbonic substance B), and 2000 g of methyl-naphthalene were charged in a stainless steel vessel, and stirred, followed by an ultrasonic dispersing treatment using a flow-type ultrasonic homogenizer (GSD600HAT, manufactured by Ginsen Co., Ltd.) with circulation for 30 min, there thereby yield a dispersion.

Next, 2700 g of the yielded aggregate graphite particle having a volume average particle size of 23 µm (first particle) was charged into a pressurized kneader, then the dispersion was charged, and methylnaphthalene was evaporated at 200° C., thereby obtaining a combined product composed of aggregate graphite particle, in which the silicon particle was combined with the carbonic substance precursor.

The thus-obtained combined product was calcined in a calcination oven in a nitrogen atmosphere at 900° C., for 2 hours. The aggregated product obtained by the calcination was disintegrated using a WARING mixer (7012S, manufactured by Waring) under the conditions of rotation rate of 3100 rpm, for 1 min, and then classified using a vibrating screen having an opening of 40 µm, thereby obtaining a composite particle having a volume average particle size of 25 µm, which was used as a negative electrode material for a lithium ion secondary battery.

With respect to the negative electrode material for a lithium ion secondary battery containing the composite particle obtained by the above production method, cross-section observation, the content of silicon atom, the average interplanar spacing, the tap density, the BET specific surface area, the volume average particle size (50% D), and the content of second particle were evaluated in the same manner as in Example 1, and the aspect ratio of first particle was evaluated as follows. The evaluation results are shown in Table 1.

[Aspect Ratio]

The aspect ratio of the obtained composite particle was determined by observing it enlarged 1000-fold using an electron microscope, selecting randomly 100 composite particles, and calculating the ratio of the length A in the direction of the major axis to the length B in the direction of the minor axis for each of them, and an arithmetic mean value thereof was used as the aspect ratio.

(Production of Negative Electrode for Lithium Ion Secondary Battery)

To 95 parts of the thus-obtained composite particle, 5 parts of a resin having a main skeleton of polyacrylonitrile (LSR7, manufactured by Hitachi Chemical Co., Ltd.) was added as a binder; the mixture was kneaded after adding an appropriate amount of NMP (N-methyl-2-pyrrolidone), followed by addition of NMP, thereby producing a slurry having a solid content of 40%.

The prepared slurry was applied by coating using an applicator on a copper foil at a solid content coating amount of 7 mg/cm$^2$, and dried for 2 hours in a drier operated at a constant temperature of 90° C. After the drying, the coated foil was roll pressed at a linear pressure of 1 t/cm, and further heat-treated in a vacuum at 160° C. for 2 hours, thereby obtaining a negative electrode for a lithium ion secondary battery. From the negative electrode for a lithium ion secondary battery, a 14 mmφ-disk was punched out for use as an evaluation sample.

(Production of Evaluation Cell)

An evaluation cell was produced by placing the negative electrode and metal lithium as a counter electrode face to face in a CR2016-type coin cell with a 20 µm-polypropylene separator arranged therebetween, and an electrolytic solution was injected therein. The electrolytic solution was prepared by dissolving LiPF$_6$ in a mixed solvent of ethyl carbonate and methyl ethyl carbonate with a volume ratio of 3/7 to the concentration of 1 mol/L, and adding 1.5 mass % of vinyl carbonate and then further 20 vol % of fluoroethylene carbonate.

(Evaluation Condition)

The evaluation cell was placed in a thermostat at 25° C. and subjected to a cycle test. Charging was carried out by charging at a constant current of 2 mA up to 0 V, and then at a constant voltage of 0 V until the current value reached 0.2 mA. Discharging was carried out at a constant current of 2 mA until the voltage value of 1.5 V. The discharge capacity and the charge and discharge efficiency were based on the results of the first charge and discharge test.

With respect to the expansion rate, an evaluation cell was disassembled at a charged condition after repeating 5 cycles of charging and discharging under the above conditions, and the ratio of the thickness of the thus obtained negative electrode to the thickness of the negative electrode at production was used as the expansion rate.

Further, the cycle performance was evaluated by the capacity retention rate, which was determined by comparing a discharge capacity after 50 cycles of charging and discharging under the above charging and discharging conditions to the discharge capacity at the first cycle.

The evaluation results are shown in Table 1.

Figure 6:
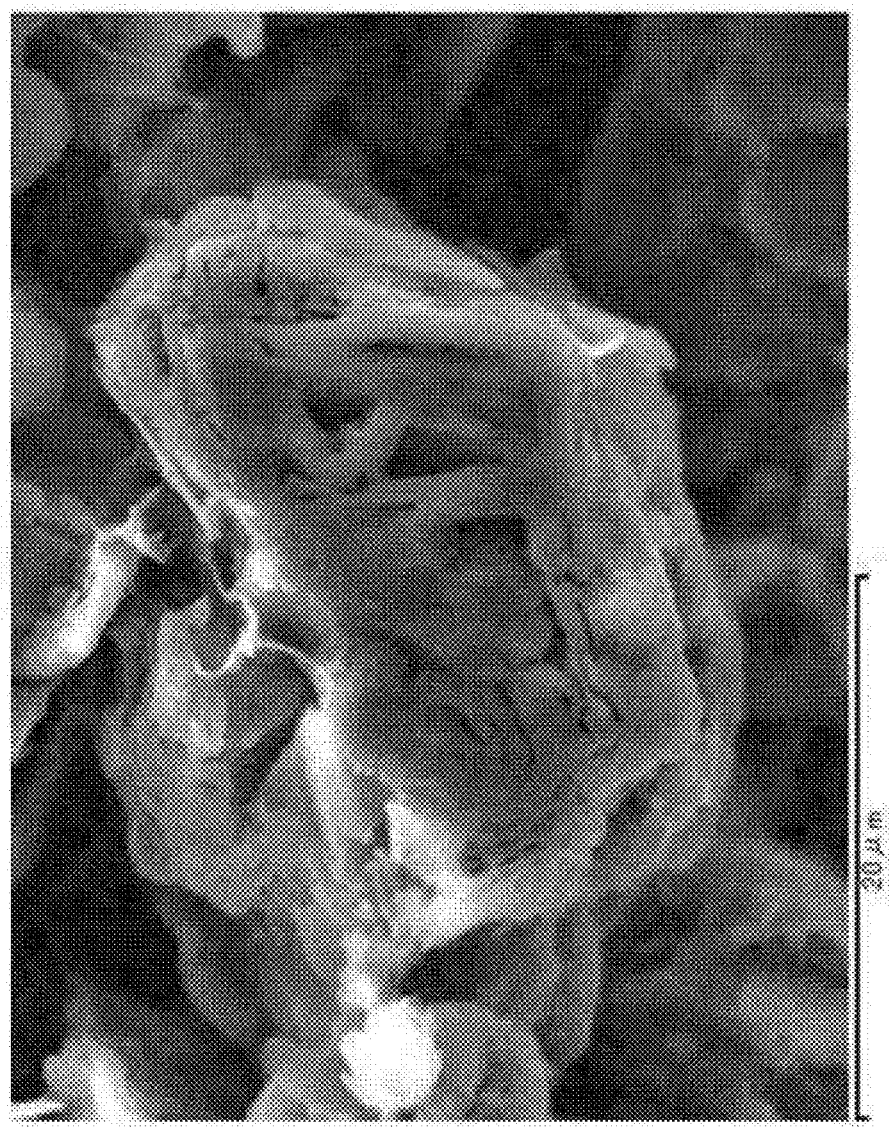
FIG. 6 is a view showing an example of a cross-section of a composite particle according to Example 11 of the present invention.
Figure 7:
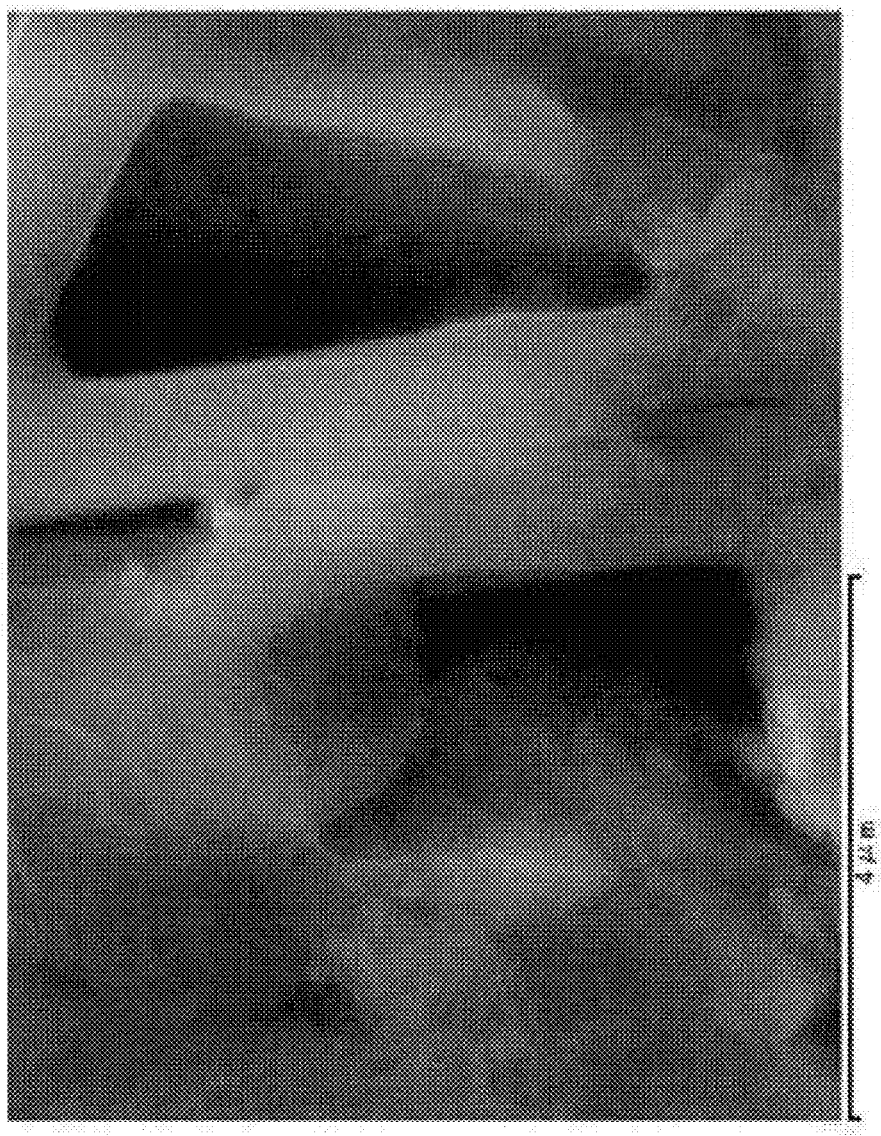
FIG. 7 is a view showing an example of a core part of a cross-section of a composite particle according to Example 11 of the present invention.
Figure 8:
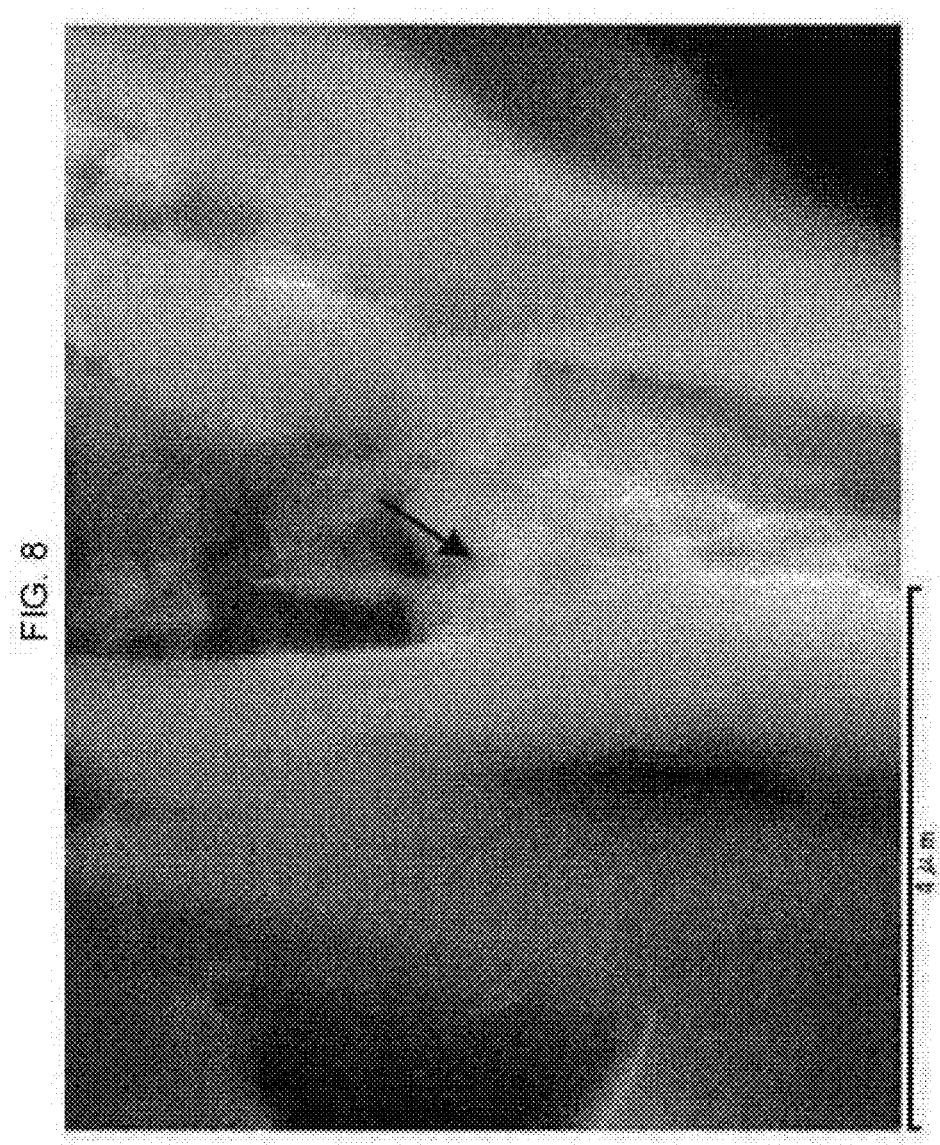
FIG. 8 is a view showing an example of a rim part of a cross-section of a composite particle according to Example 11 of the present invention.

FIG. 6 is an SEM image showing an entire cross-section of the obtained composite particle, FIG. 7 is an SEM image showing a core part of a cross-section of the composite particle, and FIG. 8 is an SEM image showing a rim part of a cross-section of the composite particle, respectively. The arrows in FIG. 8 indicate silicon particles.

It is obvious from FIG. 6 to FIG. 8 that in the composite particle according to Example 11, the silicon particle is present in the rim part but not present in the core part.

Example 12

A composite particle was produced and evaluated in the same manner as in Example 11, except that a silicon powder having a volume average particle size of 25 μm (HiSi-300, purity 99.9%, manufactured by Toyo Kinzoku Fun Kabushiki Kaisha: second particle) instead of the silicon oxide powder in Example 11 was used, a silicon slurry was prepared by pulverizing the silicon powder to have a volume average particle size of 0.2 μm, and 200 g of the slurry together with 180 g of coal tar pitch was subjected to an ultrasonic dispersing treatment. The evaluation results are shown in Table 1.

Example 13

A composite particle was produced and evaluated in the same manner as in Example 11, except that the aggregated product obtained by the calcination in Example 11 was disintegrated using a jet mill (LJ-3, manufactured by Nippon Pneumatic Mfg. Co., Ltd.) under the conditions of a pulverization pressure of 0.1 MPa, and a classification zone clearance of 12 mm, using a large louver. The evaluation results are shown in Table 1.

Example 14

A composite particle was produced and evaluated in the same manner as in Example 11, except that a negative electrode material for a lithium ion secondary battery was prepared by mixing a squamous graphite particle having a volume average particle size of 4 μm and a specific surface area of 14 m$^2$/g, at 10% with respect to the total amount with the composite particle obtained in Example 11. The evaluation results are shown in Table 1.

Example 15

A composite particle was produced and evaluated in the same manner as in Example 11, except that an aggregate graphite particle having a volume average particle size of 20 μm and an aspect ratio of 3.1 was used instead of the first particle having a volume average particle size of 23 μm and an aspect ratio of 1.5 in Example 11. The evaluation results are shown in Table 1.

Comparative Example 1

In Example 1, needle coke having a volume average particle size of 10 μm was used and together with a silicon slurry and coal tar pitch subjected to an ultrasonic dispersing treatment in methylnaphthalene, which was then evaporated from the dispersion in a pressurized kneader, thereby obtaining a combined product. The thus-obtained combined product was calcined similarly as described above, thereby obtaining an aggregated product.

The thus-obtained aggregated product was disintegrated using a jet mill (AFG, manufactured by Hosokawa Micron Corporation) under the conditions of the pulverization pressure of 0.4 MPa, and a classification rotor rotation speed of 1500 rpm to have a volume average particle size of 23 μm, thereby obtaining a composite particle.

A negative electrode material was produced and evaluated in the same manner as in Example 1, except that the thus-obtained composite particle was used. The evaluation results are shown in Table 1.

Comparative Example 2

In Example 1, needle coke having a volume average particle size of 10 μm was used and together with a silicon slurry and coal tar pitch subjected to an ultrasonic dispersing treatment in methylnaphthalene. From the dispersion, a combined product was obtained using a spray dryer (CL-8i, manufactured by Ohkawara Kakohki Co., Ltd.). Spraying was carried out using a twin jet nozzle and under the conditions of spray pressure of 0.1 MPa, and spray inlet temperature of 110° C.

The thus-obtained combined product was calcined and pulverized in the same manner as in Comparative Example 1, thereby obtaining a composite particle having a volume average particle size of 16 μm.

A negative electrode material was produced and evaluated in the same manner as in Example 1, except that the thus-obtained composite particle was used. The evaluation results are shown in Table 1.

Figure 9:
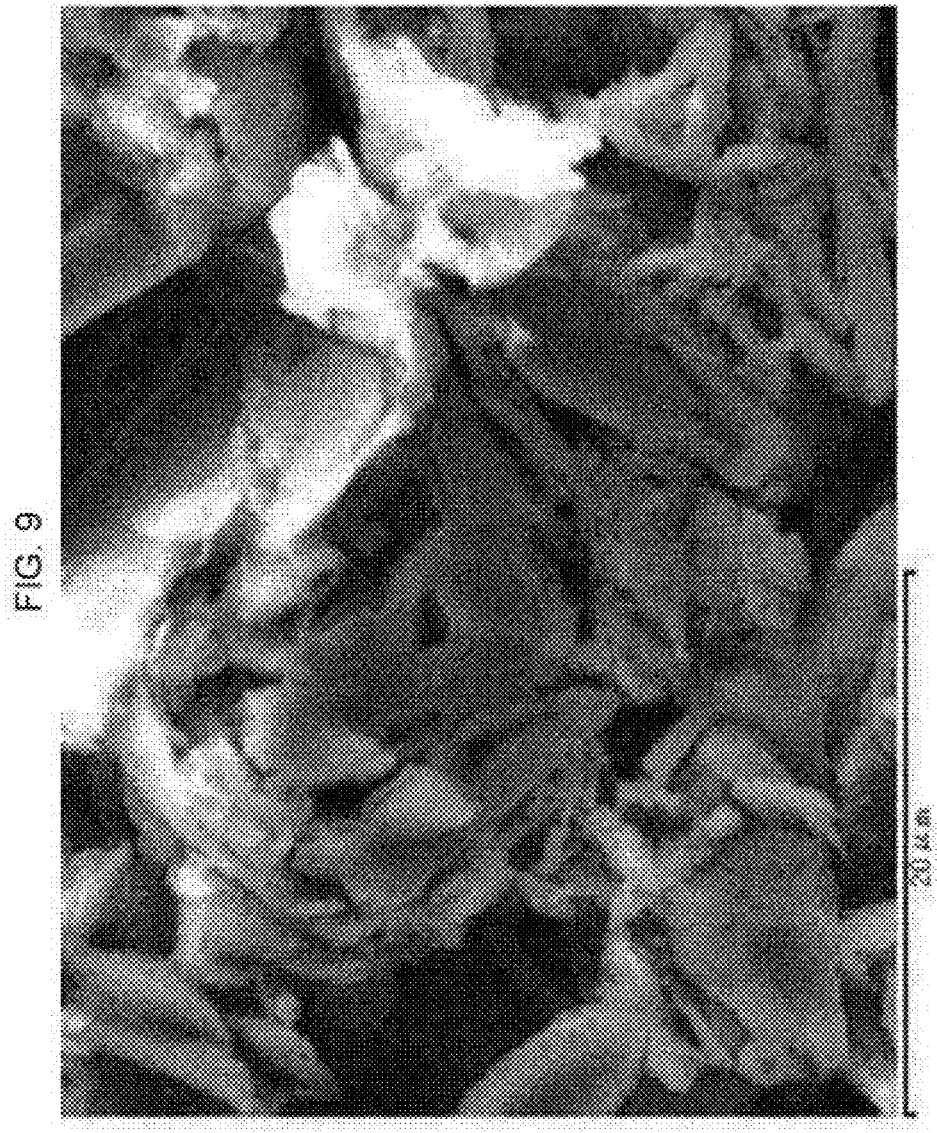
FIG. 9 is a view showing an example of a cross-section of a composite particle according to Comparative Example 2 of the present invention.
Figure 10:
FIG. 10 is a view showing an example of a core part of a cross-section of a composite particle according to Comparative Example 2 of the present invention.
Figure 11:
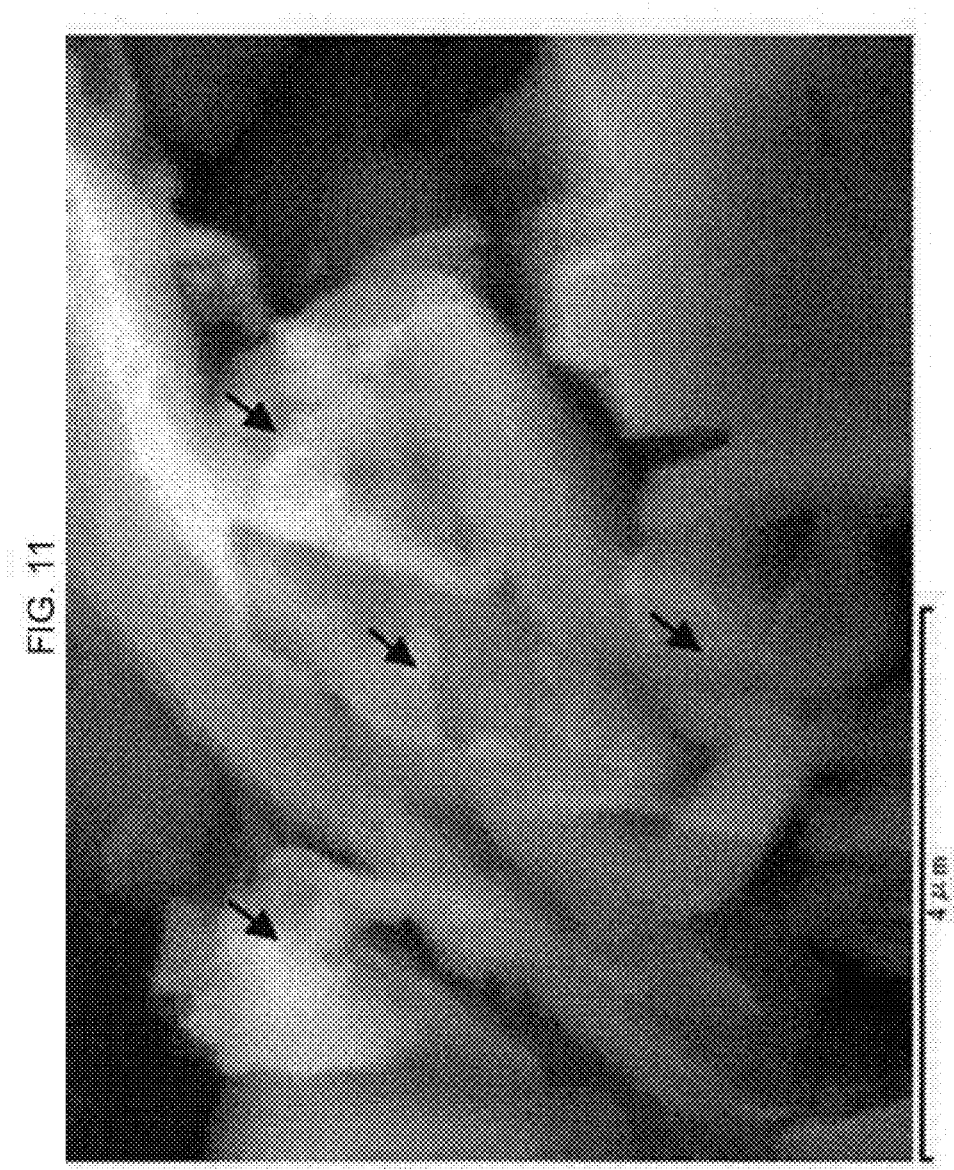
FIG. 11 is a view showing an example of a rim part of a cross-section of a composite particle according to Comparative Example 2 of the present invention.

FIG. 9 is an SEM image showing an entire cross-section of the obtained composite particle, FIG. 10 is an SEM image showing a core part of a cross-section of the composite particle, and FIG. 11 is an SEM image showing a rim part of a cross-section of the composite particle, respectively. The arrows in FIG. 10 and FIG. 11 indicate silicon particles.

It is obvious from FIG. 9 to FIG. 11 that in the composite particle according to Comparative Example 2, a silicon particle is present in the rim part as well as in the core part.

TABLE 1

| | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Comparative Example 1 | Comparative Example 2 |
|---|---|---|---|---|---|---|---|---|---|---|---|---|---|---|---|---|---|
| Second particle | Si | SiO | Si | Si | SiO | Si | SiO | SiO | SiO | SiO | SiO | Si | SiO | SiO | SiO | Si | Si |
| Disintegrating, pulverizing apparatus | Mixer | Mixer | Jet mill | Mixer | Mixer | Mixer | Mixer | Jet mill | Mixer | Mixer | Mixer | Mixer | Jet mill | Mixer | Mixer | Jet mill | Jet mill |
| Conductive particle | None | None | None | Graphite particle | None | None | None | None | Graphite particle | None | None | None | None | Graphite particle | None | None | None |
| Silicon atom content | | | | | | | | | | | | | | | | | |
| Whole particle (%) | 5.50 | 5.20 | 5.80 | 5.00 | 3.50 | 2.80 | 3.80 | 3.70 | 3.40 | 3.60 | 3.6 | 2.4 | 3.4 | 3.4 | 3.50 | 5.50 | 5.30 |
| Particle core (%) | 0.20 | 0.10 | 0.10 | 0.10 | 0.20 | 0.10 | 0.50 | 0.10 | 0.10 | 0.10 | 0.4 | 0.2 | 0.3 | 0.2 | 0.20 | 6.40 | 8.10 |
| Particle surface (%) | 5.00 | 5.30 | 6.40 | 4.60 | 4.00 | 3.00 | 3.70 | 3.80 | 3.90 | 4.00 | 3.8 | 3.1 | 3.8 | 3.4 | 3.7 | 5.00 | 4.90 |
| Surface/core | 25.0 | 53.0 | 64.0 | 48.0 | 20.0 | 30.0 | 7.4 | 38.0 | 39.0 | 40.0 | 9.5 | 15.5 | 12.7 | 17.0 | 18.5 | 0.8 | 0.6 |
| Core/whole | 0.04 | 0.02 | 0.02 | 0.02 | 0.06 | 0.04 | 0.13 | 0.03 | 0.03 | 0.01 | 0.11 | 0.06 | 0.08 | 0.06 | 0.06 | 1.16 | 1.53 |
| Circularity | — | — | — | — | 0.95 | 0.93 | 0.78 | 0.92 | 0.88 | 0.80 | — | — | — | — | — | — | — |
| Aspect ratio | — | — | — | — | — | — | — | — | — | — | 1.5 | 1.6 | 1.6 | 1.7 | 3.1 | — | — |
| Average interplanar spacing (nm) | 0.345 | 0.345 | 0.345 | 0.345 | 0.335 | 0.335 | 0.335 | 0.335 | 0.335 | 0.335 | 0.335 | 0.335 | 0.335 | 0.335 | 0.33 | 0.345 | 0.345 |
| Tap density (g/cm³) | 0.65 | 0.63 | 0.66 | 0.65 | 0.95 | 0.97 | 0.81 | 0.97 | 0.93 | 1.01 | 0.97 | 0.97 | 0.98 | 0.95 | 0.89 | 0.61 | 0.5 |
| BET specific surface area (m²/g) | 4.5 | 4.2 | 4.1 | 4.7 | 3.7 | 3.8 | 6.5 | 3.5 | 4.3 | 3.9 | 4.0 | 3.8 | 3.8 | 4.6 | 4.2 | 4.0 | 6.1 |
| Average particle size (µm) | 20 | 20 | 20 | 19 | 22 | 21 | 26 | 22 | 19 | 22 | 25 | 26 | 25 | 24 | 24 | 23 | 16 |
| Content of second particle (%) | 5.0 | 8.0 | 5.1 | 4.6 | 4.9 | 2.2 | 5.3 | 5.0 | 4.4 | 4.8 | 5.0 | 2.2 | 5.1 | 4.6 | 5.0 | 5.1 | 5.3 |
| Major axis length ratio | 0.01 | 0.03 | 0.01 | 0.01 | 0.02 | 0.01 | 0.02 | 0.02 | 0.03 | 0.02 | 0.02 | 0.01 | 0.02 | 0.02 | 0.02 | 0.01 | 0.01 |
| Electrode density (E/cm³) | 1.4 | 1.4 | 1.4 | 1.4 | 1.7 | 1.7 | 1.7 | 1.7 | 1.7 | 1.7 | 1.7 | 1.7 | 1.7 | 1.7 | 1.7 | 1.4 | 1.2 |
| Discharge capacity (mAh/g) | 402 | 405 | 404 | 395 | 416 | 423 | 427 | 421 | 411 | 410 | 420 | 423 | 427 | 415 | 415 | 395 | 413 |
| Charge and discharge efficiency (%) | 84 | 80 | 85 | 86 | 87 | 91 | 87 | 87 | 87 | 87 | 88 | 91 | 88 | 87 | 87 | 84 | 83 |
| Expansion rate (%) | 143 | 140 | 141 | 144 | 138 | 140 | 140 | 142 | 144 | 139 | 136 | 136 | 137 | 140 | 138 | 155 | 150 |
| Cycle performance (%) | 94.2 | 95.7 | 94.4 | 95 | 96.5 | 94.9 | 96.8 | 96.8 | 97.0 | 96.2 | 98.9 | 98.1 | 98.8 | 99.0 | 98.7 | 92.5 | 93.1 |

As obvious from Table 1, in the negative electrode for a lithium ion secondary battery formed by using the negative electrode material for a lithium ion secondary battery according to the present invention, expansion of the negative electrode associated with charging is suppressed. Further, it is obvious that the lithium ion secondary battery according to the present invention formed by using the negative electrode material for a lithium ion secondary battery according to the present invention is superior in cycle performance.

The entire disclosures of Japanese Patent Application No. 2010-275949, Japanese Patent Application No. 2010-275950, Japanese Patent Application No. 2010-275951, and Japanese Patent Application No. 2010-275977 are incorporated herein by reference.

All the literature, patent literature, and technical standards cited herein are also herein incorporated to the same extent as provided for specifically and severally with respect to an individual literature, patent literature, and technical standard to the effect that the same should be so incorporated by reference.

The invention claimed is:

1. A negative electrode material for a lithium ion secondary battery, the material comprising a composite particle of a first particle comprising a carbonic substance A and a second particle comprising silicon atoms, the first particle and the second particle combined by a carbonic substance B different from the carbonic substance A,
    wherein the first particle comprises a graphite particle having pores formed by assembling or binding a plurality of flat-shaped particles in such a manner that orientation planes thereof are nonparallel to each other, and
    wherein, when a cross-section of the composite particle is observed with respect to:
    a content of the silicon atoms included in a core region in a circle, the circle having a center thereof on a midpoint of a major axis constituting a maximum length of the composite particle, and having a radius of ⅛ of the length of a minor axis that orthogonally intersects the major axis at the midpoint thereof, and
    a content of the silicon atoms in a rim region of the composite particle, which extends from a circumference of the composite particle to a depth of ⅛ of the length of the minor axis,
    a ratio of the content of the silicon atoms in the rim region to the content of the silicon atoms in the core region is 2 or higher.

2. The negative electrode material for a lithium ion secondary battery according to claim 1, wherein a ratio of the content of the silicon atoms included in the core region in the circle to a total content of the silicon atoms included in the cross-section of the composite particle is 0.2 or smaller.

3. The negative electrode material for a lithium ion secondary battery according to claim 1, wherein the first particle further comprises a graphite particle with a circularity of from 0.60 to 1.00.

4. The negative electrode material for a lithium ion secondary battery according to claim 1, wherein the first particle has a volume average particle size of from 5 μm to 40 μm.

5. The negative electrode material for a lithium ion secondary battery according to claim 1, wherein the first particle has an aspect ratio of from 1.2 to 5.0.

6. The negative electrode material for a lithium ion secondary battery according to claim 1, wherein a volume average particle size of the flat-shaped particles is ⅔ or less of the volume average particle size of the first particle.

7. The negative electrode material for a lithium ion secondary battery according to claim 1, wherein a content of the carbonic substance B in the entire composite particle is from 1 mass % to 10 mass %, and the carbonic substance B comprises a carbonized organic substance.

8. The negative electrode material for a lithium ion secondary battery according to claim 1, further comprising a substance having electrical conductivity.

9. A method of producing the negative electrode material for a lithium ion secondary battery according to claim 1, the method comprising: combining the first particle comprising the carbonic substance A and the second particle comprising the silicon atoms using the carbonic substance B different from the carbonic substance A to obtain the composite particle having a volume average particle size of from 1.0 to 1.3 times the volume average particle size of the first particle.

10. A negative electrode for a lithium ion secondary battery, comprising:
    a collector; and
    a negative electrode material layer provided on the collector, the negative electrode material layer comprising the negative electrode material for a lithium ion secondary battery according to claim 1.

11. A lithium ion secondary battery, comprising:
    the negative electrode for a lithium ion secondary battery according to claim 10;
    a positive electrode; and
    an electrolyte.

12. The negative electrode material for a lithium ion secondary battery according to claim 1, wherein the ratio of the volume average particle size of the composite particle to the volume average particle size of the first particle is from 1.01 to 1.25.

* * * * *